(12) United States Patent
Pogorelik et al.

(10) Patent No.: US 11,019,084 B2
(45) Date of Patent: May 25, 2021

(54) CONTROLLER, A CONTEXT BROADCASTER AND AN ALERT PROCESSING DEVICE

(71) Applicant: Intel Corporation, Santa Clara, CA (US)

(72) Inventors: Oleg Pogorelik, Lapid (IL); Glen J Anderson, Beaverton, OR (US); Adi Shaliv, Nir-Banim (IL); Michael Kara-Ivanov, Maale Adumim (IL)

(73) Assignee: Intel Corporation, Santa Clara, CA (US)

( * ) Notice: Subject to any disclaimer, the term of this patent is extended or adjusted under 35 U.S.C. 154(b) by 235 days.

(21) Appl. No.: 16/220,251

(22) Filed: Dec. 14, 2018

(65) Prior Publication Data
US 2019/0141069 A1 May 9, 2019

(51) Int. Cl.
*H04L 29/06* (2006.01)
*B60W 10/06* (2006.01)
(Continued)

(52) U.S. Cl.
CPC ......... *H04L 63/1425* (2013.01); *B60W 10/06* (2013.01); *B60W 20/50* (2013.01);
(Continued)

(58) Field of Classification Search
CPC ......... H04L 63/10; H04L 63/12; H04L 63/14; H04L 63/1408; H04L 63/1416;
(Continued)

(56) References Cited

U.S. PATENT DOCUMENTS

| 2014/0229568 A1* | 8/2014 | Raffa | H04W 4/44 709/217 |
| 2014/0333729 A1* | 11/2014 | Pflug | G06T 15/20 348/47 |

(Continued)

FOREIGN PATENT DOCUMENTS

| CN | 105051710 B | 8/2018 |
| WO | 2017130122 A1 | 8/2017 |

OTHER PUBLICATIONS

"CAN FD—The basic idea", CAN in Automation (CiA), 3 pages, Retrieved from the Internet: URL: https://www.can-cia.org/can-knowledge/can/can-fd/ [retrieved on Jan. 8, 2019].

(Continued)

*Primary Examiner* — Malcolm Cribbs
(74) *Attorney, Agent, or Firm* — Viering, Jentschura & Partner mbB

(57) ABSTRACT

A controller may include one or more processors configured to control an automotive operating function representing an operation of an actuator of an automobile; receive a first message in accordance with an automotive fieldbus communication protocol via a fieldbus communication network, wherein the first message comprises contextual information associated with the automobile; determine whether a relation between the contextual information and a status of the automotive operating function fulfills a predefined criterion; generate a second message in accordance with the automotive fieldbus communication protocol, wherein the second message comprises information representing a result of the determination.

19 Claims, 10 Drawing Sheets

(51) Int. Cl.
*B60W 20/50* (2016.01)
*B60W 30/18* (2012.01)
*B60W 50/02* (2012.01)
*H04L 12/40* (2006.01)
*B60W 40/04* (2006.01)

(52) U.S. Cl.
CPC ...... *B60W 30/18181* (2013.01); *B60W 40/04* (2013.01); *B60W 50/0205* (2013.01); *H04L 12/40* (2013.01); *H04L 63/1483* (2013.01); *B60W 2050/021* (2013.01); *H04L 2012/40215* (2013.01)

(58) Field of Classification Search
CPC . H04L 63/1425; H04L 12/40; H04L 63/1483; H04L 2012/40215; G06F 21/55; G06F 21/57; B60W 10/06; B60W 20/50; B60W 30/18181; B60W 40/04; B60W 50/0205; B60W 2050/021
See application file for complete search history.

(56) References Cited

U.S. PATENT DOCUMENTS

| | | | |
|---|---|---|---|
| 2015/0057891 A1* | 2/2015 | Mudalige | B60W 10/18 701/42 |
| 2015/0155007 A1* | 6/2015 | Barfield, Jr. | G06T 17/05 386/278 |
| 2016/0139755 A1* | 5/2016 | Bushmitch | H04L 9/3231 715/707 |
| 2017/0013005 A1* | 1/2017 | Galula | H04L 67/12 |
| 2017/0235698 A1* | 8/2017 | van der Maas | H04L 63/14 710/106 |
| 2017/0243008 A1* | 8/2017 | Cornell | G06Q 10/0633 |
| 2017/0329332 A1 | 11/2017 | Pilarski et al. | |
| 2018/0005527 A1 | 1/2018 | Bostick et al. | |
| 2018/0191738 A1* | 7/2018 | David | H04L 63/101 |
| 2018/0247045 A1* | 8/2018 | David | H04L 67/12 |
| 2018/0316699 A1* | 11/2018 | David | G06F 21/552 |
| 2019/0141069 A1 | 5/2019 | Pogorelik et al. | |
| 2020/0117912 A1* | 4/2020 | Thompson | G06K 9/00791 |

OTHER PUBLICATIONS

M. Hayes et al., "Contextual Anomaly Detection Framework for Big Sensor Data", Western Graduate & Postdoctoral Studies, May 2014, 92 pages, Journal of Big Data (2015) 2:2 DOI 10.1186/s40537-014-0011-y.

International Search Report based on Application No. PCT/US2019/057114, dated Feb. 6, 2020, 11 pages (for reference purpose only).

* cited by examiner

305 — Validation of anomaly with cloud-based analysis

303 — Anomaly comparisons at edge with peer-to-peer vehicles and RSUs

301 — On-vehicle anomaly detection

CONTROLLER, A CONTEXT BROADCASTER AND AN ALERT PROCESSING DEVICE

TECHNICAL FIELD

Various aspects of this disclosure relate generally to a controller, a context broadcaster and an alert processing device.

BACKGROUND

In general, CAN (Controller Area Network) may be used for a robust vehicle message bus widely adopted in existing and future vehicles and designed to allow microcontrollers and devices to communicate with each other without a host computer. CAN relies on a message-based protocol, where message sources such as engine control unit, brake system, cruise control, as examples, are identified by message ID (also referred as to soft wiring). However, the CAN communication protocol openness and lack of built-in security infrastructure are main reasons for a weak security and low resiliency compared to the various competitors of CAN.

For example, an attacker may connect a malicious device to the debug socket (OBD—On-Board-Diagnostic) or replace one of the CAN connected units, e.g., an ECU (electronic control unit) or a MCU (microcontroller), and broadcast spoofed messages or overwrite the real messages with colliding messages sharing alternate values that confuse critical systems and may potentially lead to severe accidents.

Conventionally, the CAN security is enhanced by several add-ons that provide for anomaly detection. The conventional anomaly detection establishes barriers in securing vehicle messaging infrastructure.

For example, message encryption and authentication (MEC) by the CAN connected end points may be applied. However, the MEC may increase the power consumption and/or affect performance, such that its operation may not be applicable for low power MCUs/ECUs. Further, MEC may include key provisioning and management functions that open additional attack surfaces and complicates some maintenance procedures.

For example, an anomaly/intrusion detection (IDS) system may be applied. The IDS may be limited by detection delays that might be inapplicable in some systems. Further, the IDS may be expensive and may require a tight/intrusive CAN integration.

For example, a sequence analysis may include a probabilistic measurement of the Bollinger exceptions (improbable values) based on an aggregated history of normal samples. However, the sequence analysis may result in a low response time and is very application specific and error prone.

Thus, conventional anomaly detection systems are expensive, compute intensive, slow, complicated and non-scalable. Putting an IDS system out of the MCU/ECU leaves mitigation of the determined anomaly vulnerable. An IDS command to an appropriate ECU/MCS could be blocked or spoofed, such that the MCU/ECU will not be able to react accordingly.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1A:
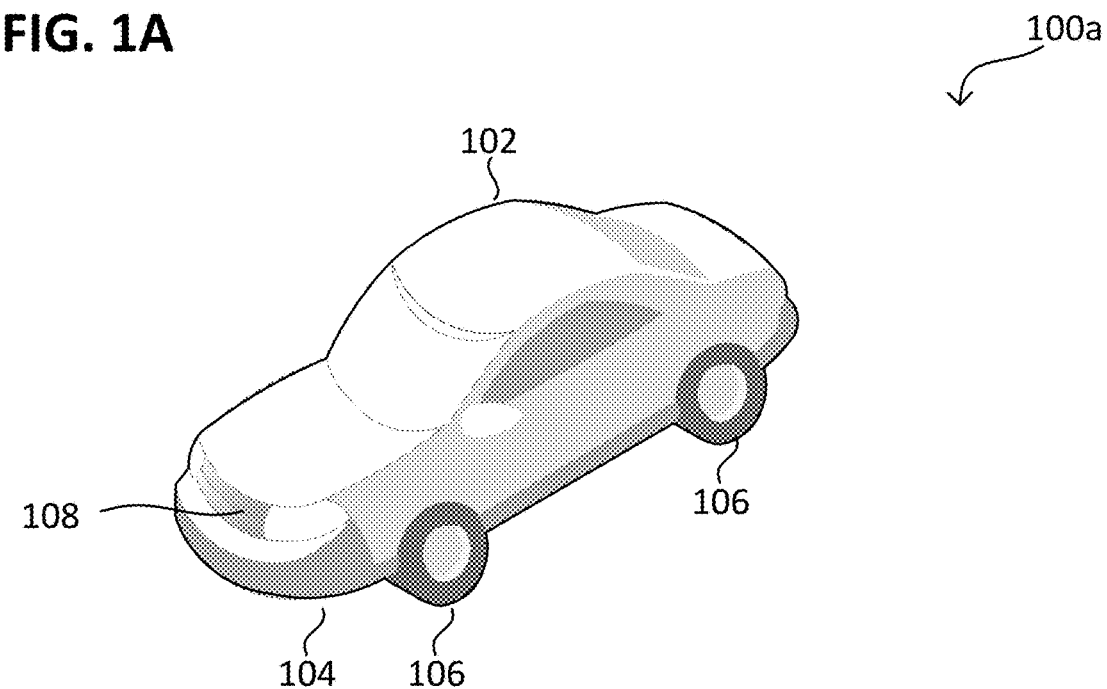
FIG. 1A shows an automobile in a schematic cross view according to various aspects and FIG. 1B shows the automobile in a schematic communication diagram.

The following detailed description refers to the accompanying drawings that show, by way of illustration, specific details and examples in which the invention may be practiced.

The word "exemplary" is used herein to mean "serving as an example, instance, or illustration". Any example or design described herein as "exemplary" is not necessarily to be construed as preferred or advantageous over other examples or designs.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The term "processor" as, for example, used herein may be understood as any kind of entity that allows handling data, signals, as examples. The data, signals, as example, may be handled according to one or more specific functions executed by the processor.

A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the method steps detailed herein may be performed (e.g., realized) by a processor, may by one or more specific functions executed by the processor.

The term "system" (e.g., a drive system, a position detection system, as examples,) detailed herein may be understood as a set of interacting elements, the elements may be, by way of example and not of limitation, one or more mechanical components, one or more electromechanical converters (or other types of actuators), one or more electrical components, one or more instructions (e.g., encoded in storage media), one or more controllers, as examples.

The term "actuator" may be understood as any component (e.g., of a machine) that is responsible for moving and controlling a mechanism or system, for example by opening a valve. The actuator may, for example, require a control signal and a source of energy. The control signal may transmit less energy than the source of energy to the actuator. The control signal may be an electric voltage or current. When the actuator receives the control signal, the actuator may respond by converting the control signals energy into mechanical energy (e.g., by motion). In other words, the actuator may include or be formed from an Electromechanical converter. Also other types of actuator may be used, e.g., converging converting the control signals energy into at least one of radiation (e.g., light) energy, thermal energy, pneumatic energy, another electric energy, and hydraulic energy.

The term "controller" may be understood as any kind of a logic implementing entity, which may be special purpose circuitry or a processor executing software stored in a memory, firmware, or any combination thereof. Thus, a "controller" may include a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "controller" may, additionally or alternatively, include one or more processors executing software or at least code segments, e.g. any kind of computer program, e.g., a computer program using a virtual machine code such as e.g., Java.

The controller may be configured, e.g., by the code segments (e.g., software), to control the operation of a system (e.g., its operating point), e.g., an automobile or parts thereof, e.g., at least its powertrain. Generally, the system may include one or more functions to be operated (also referred as to operating functions) of which each may be controlled for operating the whole system.

The term "control" can be understood as an intended change of the system, e.g., by influence. Therefore, the status of the system, e.g., the one or more operating functions, can be changed according to a target status. A regulation may be understood as closed control loop, that is, additionally, a change of the status of the system (e.g., due to disturbances or other errors) is counteracted. Illustratively, the pure controlling (also referred as to open control loop) may implement a forward-directed control channel, and thus, illustratively implements a sequential control, which converts an input variable straight into an output variable. The control channel can also be part of a closed control loop that includes a feedback channel, so that a regulation is implemented. The regulation includes, in contrast to the pure forward-directed control channel, a continuous influence of the output variable on the input variable, which is affected by the closed control loop (including feedback). In other words, as an alternative or in addition to the control, a regulation can be implemented, or, alternatively or in addition to the controller, a closed-loop controller can be used.

In the case of the closed loop control, an actual value of the controlled variable (for example, based on a measured value) is compared with a reference value (a target value or a default value), and based thereon, the controlled variable can be influenced (e.g., using an actuator), such that a deviation of the respective actual value of the controlled variable from the reference value will be minimized.

The controller may optionally include a memory, e.g., storing code segments that represent the processes provided by the controller, e.g., the controlling of the one or more operating functions. Additionally or alternatively, the memory may store one or more criterion, rules, and algorithms, as examples, as detailed herein.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, as examples, or any combination thereof. Furthermore, it is appreciated that registers, shift registers, processor registers, data buffers, as examples, are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

According to various aspects, the one or more processes performed by one or more processors may, illustratively as counterpart, be realized by code segments stored in the memory, wherein, the code segments cause, if executed by the one or more processors, the one or more processors to perform the processes (e.g., functions and methods). The code segments, e.g., provided as part of the software, may be updated via a mobile network, e.g., on demand.

Any other kind of implementation of the respective processes, which will be described in more detail below may also be understood as provided by a one or more processors, e.g. of the controller. It is understood that any two (or more) of the controllers detailed herein may be realized as a single controller with substantially equivalent functionality, and conversely that any single controller detailed herein may be realized as two (or more) separate controller with substantially equivalent functionality. Additionally, references to a "controller" may refer to two or more controller that collectively form a single controller.

According to various aspects, a fieldbus communication network may be understood as a network for, e.g., real-time distributed, communication, e.g., via a message-based communication protocol. The fieldbus communication network may be provided, for example, in a daisy-chain, star, ring, branch, and/or tree network topology or a mixture thereof. The order and priority of a multiple of messages that are send via the fieldbus communication network is defined by the fieldbus communication protocol. Such fieldbus communication protocol may be configured for real-time distributed control, e.g., standardized as International Electrotechnical Commission (IEC) 61158 (title "Digital data communications for measurement and control—Fieldbus for use in industrial control systems", e.g., in the version of May 2, 2017). The fieldbus communication protocol may be configured for a package-based communication (also referred as to message-based communication). Each message may include at least a frame, and, embedded therein information to be transmitted via the message. The fieldbus communication network may be configured to fulfill a real-time criterion in order to provide the real-time distributed communication. The real-time criterion may be defined by the operation of automobile, e.g., an operation of the powertrain of the automobile. For fulfilling the real-time criterion, the fieldbus communication network may be configured for a time-triggered communication. Additionally or alternatively, for fulfilling the real-time criterion, the fieldbus communication network may be configured to deliver each message via the fieldbus communication network in less than about 100 milliseconds (ms), for example, less than about 10 ms, 1 ms or 100 microseconds (e.g., less than about 10 µs or 1 µs).

According to various aspects, various physical entities (e.g., actuator, controller or sensor as examples) may be connected with each other, e.g., via a network (e.g., package-based communication) or other communication types (e.g., data connections). It is understood, that each of the physical entities may include an interface that is configured to provide the respective type of communication, e.g., including at least one of a logical interface and/or a physical interface (e.g., the socket or pins). For example, a package-based communication may be in accordance with a communication protocol implemented by the interface. In case of message-based communication, the interface may include an encoder that is configured to encode the information to be send into the message to be send in accordance with the respective communication protocol. Additionally or alternatively, the interface may include a decoder that is configured to decode the information from the received message in accordance with the respective communication protocol.

For controlling, an analog or serial communication (e.g., analog controlling or serial controlling) may be used. For example, the interface may include a respective (e.g., analogous or digital) signal output that is configured to provide an (e.g., analogous or digital) signal based on the information to be sent. The controlling of an operating function may include an analog communication or a digital communication. The digital communication for controlling may be modulated, e.g., pulse width modulated or amplitude modulated.

According to various aspects, the automobile may include various types of ground-based vehicles, such as an autonomous (e.g., unmanned) vehicle, a passenger car (also referred as to car or manned vehicle), an omnibus, a truck, or other motor vehicles, such as a (e.g., only) combustion driven vehicle, an (e.g., only) electric driven vehicle, and a combustion and electric driven vehicle (e.g., hybrid vehicle), as examples.

According to various aspects, an automobile may be equipped with an infrastructure for anomaly detection. The infrastructure may include multiple anomaly detection algorithms, of which each is adapted to one specific controller of multiple CAN-connected controllers to be executed by the specific controller. Such, a distributed anomaly detection is provided that enables to adapt anomaly detection algorithms to the specific type and operation of the controller, thus reducing the algorithm complexity and the communication extent. For example, the controllers may, locally, compare controller exterior information with controller internal information (e.g., representing a controlled automotive operating function). Furthermore, the infrastructure may include a broadcaster that provides, as external data, cloud data to the multiple CAN-connected controllers such that, in each of the CAN-connected controllers, the respective anomaly detection algorithm processes local and cloud data for anomaly detection.

According to various aspects, a local MCU/ECU specific implementation of an anomaly detecting extension may be provided. For example, support for secure delivery of a mitigation command (since the mitigation command is worked out internally in MCU/ECU and not exposed on CAN bus), may be provided. Scalable and light weight, non-invasive integration may be provided. An anomaly detection may be provided that is more reliable than conventional CAN bus-based approaches as merely based on message monitoring.

For example, a minimalistic and/or inexpensive anomaly detection may be provided. For example, the minimalistic and/or inexpensive anomaly detection utilizes existing components or does not necessarily need additional components.

For example, an anomaly detection may be provided that is faster than conventional approaches, e.g., as not necessarily requiring data aggregation and averaging.

Figure 1B:
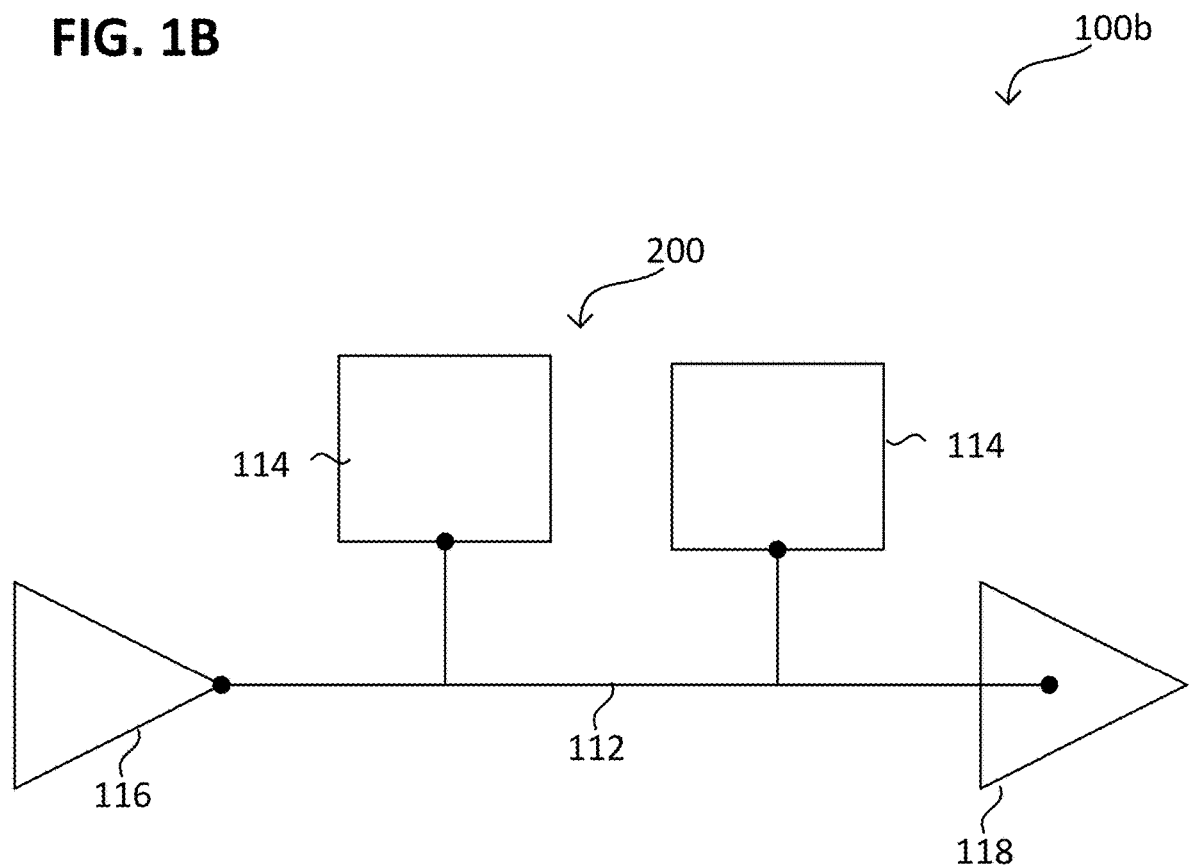

FIG. 1A illustrates an automobile 100 in a schematic cross view according to various aspects according to various aspects and FIG. 1B the automobile 100 in a schematic communication diagram 100b. Beside the automobile 100, the details described for the automobile 100 may be also applied to other types of ground vehicles (also referred as to vehicles).

The automobile 100 may include at least one of: a chassis 102, a body 104 and a powertrain 106.

The chassis 102 may include a vehicle frame including one or more regions for mounting at least one of the powertrain 106 and the chassis 102. The powertrain 106 may include at least one of: one or more engines, one or more transmissions, and a plurality (e.g., 4) of wheels 106. The one or more engines may include at least one combustion engine and/or at least one electric engine. The chassis 102 may provide the underpart of the automobile 100, on which the body 104 (also referred as to coachwork) of the automobile 100 and one or more passenger seats are mounted. The powertrain 106 may optional include additional components such as one or more breaks, one or more gears, as examples.

The automobile 100 may optionally include one or more sensors 108 (also referred as to exterior vicinity sensors 108) configured to sense an exterior vicinity of the automobile 100. The automobile 100 may optionally include a navigation system including one or more geolocation sensors (e.g., including a GPS-sensor). The automobile 100 may optionally include a mobile communication system including one or more antennas.

The navigation system may be configured to provide navigational information (e.g., via audio or visual output) such as but not limited to map information, location information of the automobile 100, directional information, information on nearby vehicles, information on traffic conditions, routing information, as examples. The navigation system may be compatible to a positioning system, such as but not be limited to a global system, e.g., Global Positioning System (GPS), Global Navigation Satellite System (GLONASS, BDS, IRNSS or Galileo) or another satellite-based and/or radio-based navigation system, e.g., a space-based radio navigation system or a global navigation satellite system.

GLONASS refers to "Global Navigation Satellite System", that is a space-based satellite navigation system operating in the radionavigation-satellite service. GLONASS provides an alternative to GPS and is the second navigational system in operation with global coverage and of comparable precision. BDS refers to "BeiDou Navigation Satellite System" that is a Chinese satellite navigation system. IRNSS refers to "Indian Regional Navigation Satellite System" that is an autonomous regional satellite navigation system that provides accurate real-time positioning and timing services. Galileo refers to the global navigation satellite system (GNSS) of the European Union created through the European GNSS Agency (GSA).

The one or more exterior vicinity sensors 108 may include one or more infrared sensors, one or more cameras, one or more microphones, one or more motion sensors, one or more ultrasonic sensors, one or more radar sensors, one or more lidar sensors, and one or more approaching sensors. Other sensors may be present, for example, one or more seat occupation sensors.

Furthermore, the automobile 100 may include an automotive alert detection system 200 as shown in the communication diagram 100*b*.

The automotive alert detection system 200 may include an automotive fieldbus communication network 112, one or more controllers 114, one or more context broadcasters 116, and optionally one or more alert processing devices 118. The one or more controllers 114, one or more context broadcasters 116, and one or more alert processing devices 118 may be communicatively connected via the automotive fieldbus communication network 112.

Each controller 114 may include or be formed from a chip, an optional expansion card, or an optional one or more interfaces for communicating with other entities of the automobile 100, e.g., via the automotive fieldbus communication network 112. Each controller 114 may be configured to control an automotive operating function of the automobile 100.

The automotive fieldbus communication network 112 may include a bus system. The bus system may include one or more hardware communication components (e.g., one or more wires, one or more optical fibers, as examples) and include a fieldbus communication protocol, and optionally include one or more processors running software components according to the automotive fieldbus communication protocol.

Controller 114 may be part of a cybernetic system. The cybernetic system may include a closed control loop (including feedback channel and controlling channel). For example, an actuator that is controlled by the controller 114 may change the status of one or more automotive operating functions, which potentially may be disturbed or otherwise influenced. The change of the one or more automotive operating functions (including the disturbance) may be reflected to the controller 114 via the feedback channel, which triggers the controller 114 to change the actuator to compensate the disturbance. For example, controller 114 may be part of an engine control unit (ECU), a brake system, or a cruise control of the automobile 100.

An automotive operating function of the automobile 100 may be understood as a function that enables operation of the automobile 100 (also referred as to automotive function). Operating the automobile 100 may include driving the automobile 100, e.g., via operating one or more driving related entities of the automobile 100, e.g., the engine, the transmission, the gear, the breaks, or the like.

For operating the automobile 100, one or more actuators of automobile 100 may be controlled. The one or more actuators may include actuators of the powertrain 106, e.g., such as one or more actuators of the gear, one or more actuators of the engine, one or more actuators of the transmission, one or more actuators of the breaks, as examples. The actuators may be part of an open control loop or a closed control loop (that is including a feedback channel), in which changes of the status of the automotive operating function may be fed back (reported) to the controller 114. Examples of automotive operating functions are break control, cruise control, transmission control, engine management, drive control, gear control (e.g., downshift or upshift), acceleration control.

The automotive alert detection system 200, e.g., in various implementations, may be described in more detailed in the following. For a better understanding, the automotive fieldbus communication network 112 is exemplarily described referring to CAN (Controller Area Network). However, the same network may in analogy apply to other types of automotive fieldbus communication networks 112, such as Can-FD (CAN with Flexible Data-Rate), LIN (Local Interconnect Network) or FlexRay. FlexRay provides an automotive fieldbus communication protocol for high data rates, e.g., up to 10 Mbit/s, and explicitly supports both star and "party line" bus topologies, and can have two independent data channels for fault-tolerance. LIN is a broadcast serial network comprising 16 nodes and provides a serial network protocol used for communication between components in vehicles. According to LIN, the master and slaves are typically microcontrollers, but may be implemented in specialized hardware or an application-specific integrated circuit (ASIC) in order to save cost, space, or power. Can-FD is an extension to the CAN bus protocol as specified in International Organization for Standardization (ISO) 11898 (title "Road vehicles—Controller area network (CAN)", e.g., in the version of 2015). Can-FD may be configured to record and transmit data, including errors, between devices and microcontrollers without the use of a central, "host" computer. CAN FD also allows for more storage capacity in the CAN-frame of the message. While CAN has the capacity to hold 8 bytes of data within the CAN-frame, CAN FD can hold up to 64 bytes of data within the CAN-frame.

Figure 2:
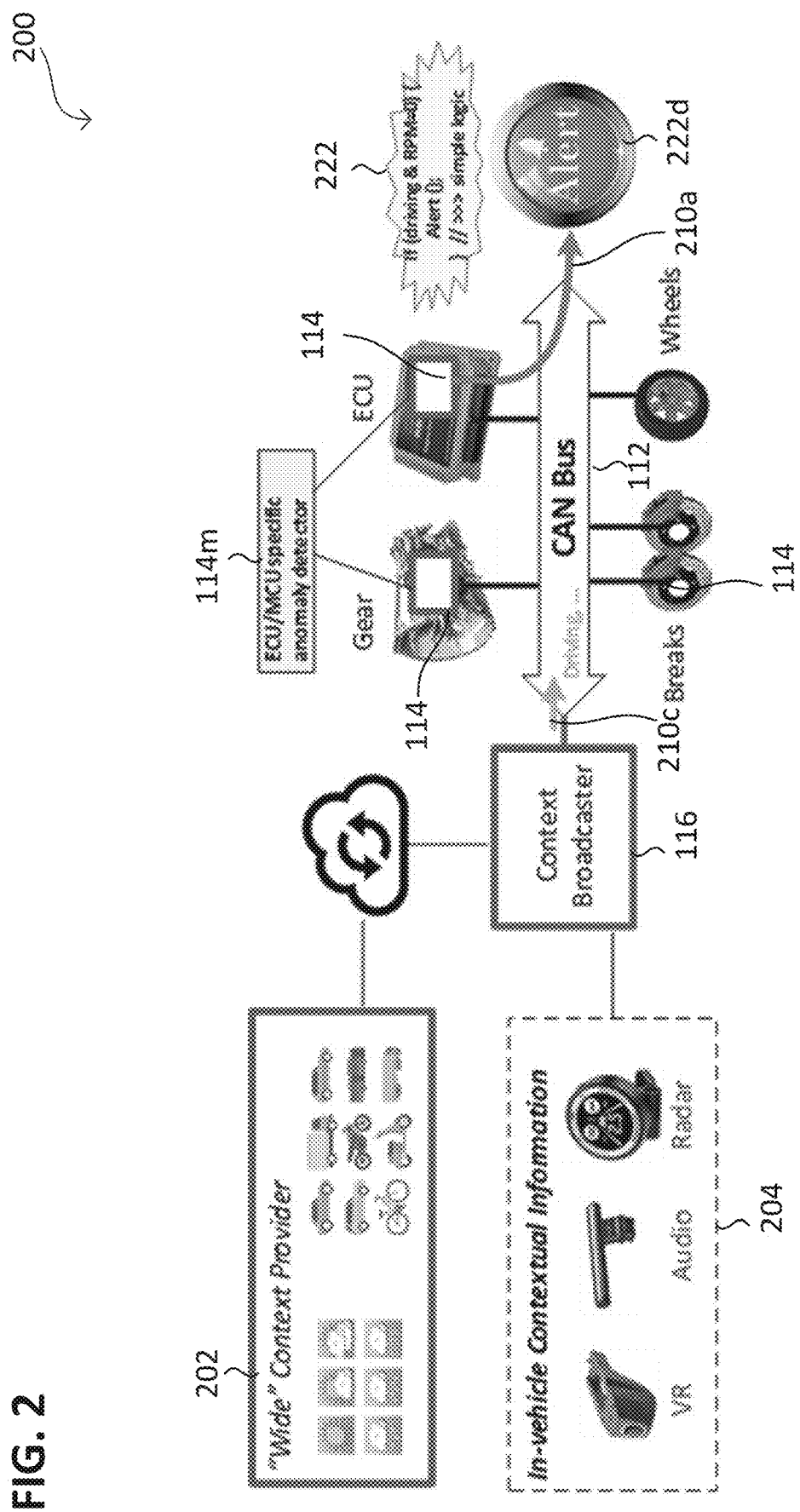
FIG. 2 shows an automotive alert detection system in a schematic communication diagram according to various aspects.

FIG. 2 illustrates an automotive alert detection system 200 in a schematic communication diagram according to various aspects. Via the automotive alert detection system 200, an improvement of reliability and security of the CAN bus may be provided. The automotive alert detection system 200 may provide for distributed context-based anomaly detection (CBAD) to support advanced, effective, robust and low cost anomaly detection in CAN messaging systems.

Utilizing the fact that CAN messages should be highly correlated with the inputs coming from high-level contextual information providers, the automotive alert detection system 200 (also referred as to CBAD-system) may provide for detecting the situations where CAN messages are not matching expected (correlated) exchanges (that is, they are inconsistent).

The CBAD-system 200 may be configured to trigger an anomaly alert 222*d* and/or a consequent remediation procedure, e.g., when such inconsistency is detected (also referred as to anomaly detection). The CBAD-system 200 may be configured to utilize the ability of detecting an anomaly using contextual information by including one or more of the following system entities.

As a first system entity, the CAN communication protocol may be configured for transmitting (e.g., sending and/or receiving) a context message 210c and/or a local alert message 210a, e.g., in order to support context and alert propagation over the CAN bus 112. The context message and the local alert message will be described in more detail later.

As a second system entity, an anomaly detection module (ADM) 114m (also referred as to CBAD-module) may be built in the one or more controllers of the automobile 100. Each controller 114 may include or be formed from at least one of a ECU (electronic control unit) and/or a MCU (microcontroller). The ADM 114m may be implemented via software (e.g., algorithm) and/or hardware, e.g., added to and/or modifying a conventional controller. For example, the ADM 114m may be added to the controller by updating the software (e.g., firmware) of the controller. The ADM 114m may implement a robust and simple detection logic. For example, each ADM 114m modified ECU/MCU may implement its own and/or an ECU/MCU specific detection algorithm. As example, the detection algorithm may include or be formed from a minor complex (e.g., if-then-else) logic.

As a third system entity, one or more context broadcasters (CB) 116 may be used for creating and broadcasting in-vehicle context via the CAN bus 112. Each context broadcaster 116 may be configured to receive data from one or more "wider context" providers (WCP) 202, e.g., including one or more automobile 100 external sources. Each WCP 202 may be configured to provide (e.g., generate) advanced contextual information originating from the one or more automobile 100 external sources.

CB 116 may be configured to consolidate information coming from in-vehicle sources 204 and/or one or more automobile 100 external sources 202 to create essential context details allowing the individual controller 114 (e.g., ECU) to implement onboard the automobile 100 at least light weight (simple) controller specific procedures for detecting message induced anomalies indicating potential security breaches or systems malfunctioning.

CB 116 may be configured to generate and send one or more context messages (CM) 210c via the CAN bus 112. Each context message 210c may include at least one contextual information, as described in detail later.

Controller 114 may be configured to send one or more alert messages (AM) 210a to report that an anomaly has been determined (also referred as to anomaly event) to the higher level system. The higher level system may, e.g., via one or more alert processing devices 222, process the each AM 210a to validate (also referred as to anomaly validation) the anomaly as determined. In response to validating the anomaly as determined, the higher level system 222 may, e.g., via one or more alert processing devices 222, output an alert signal 222d, e.g., an audio signal and/or a visual signal to one or more passengers of the automobile 100. For example, the alert signal 222d may be output via the dash of the automobile 100, via the audio system of the automobile 100, or via one or more in-vehicle light sources, as examples. Additionally or alternatively, an alert response schema may be initiated that brings the automobile 100 into a safe condition (e.g., full stop), e.g., triggered by the alert signal 222d.

Optionally the CAN 112, e.g., its communication protocol, and/or each controller 114 connected to the CAN 112, may be configured to support that the AM 210a and/or CM 210c exceeds 8 bytes in size. For example, the message structure may require data exceeding 8 bytes (e.g., 8 bytes as mandated by CAN) to be transferred. Therefore, the CAN 112, e.g., its communication protocol, may be CAN-FD compatible. Alternatively, other communication protocol changes may be applied to exceed the 8 bytes message size limit of the CAN communication protocol. The CAN 112, e.g., its communication protocol, and/or each controller 114 connected to the CAN 112, may be configured to support a payload (that is, a data field) up to 64 bytes in size or more.

For example, changes and/or extensions in an existing application programming interface (API) and definitions thereof may be provided to support the above capabilities. The one or more CB 116 may implement context generation and management thereof. For implementing the anomaly detection in an existing MCU or another controller, the ADM 114m may be provided thereto. The WCP 202 may be configured to combine high and low level capabilities to achieve the above functionality.

Further, the automotive alert detection system 200 (APD) may be provided for advanced infrastructure services based anomaly detection as described in the following.

Figure 3:
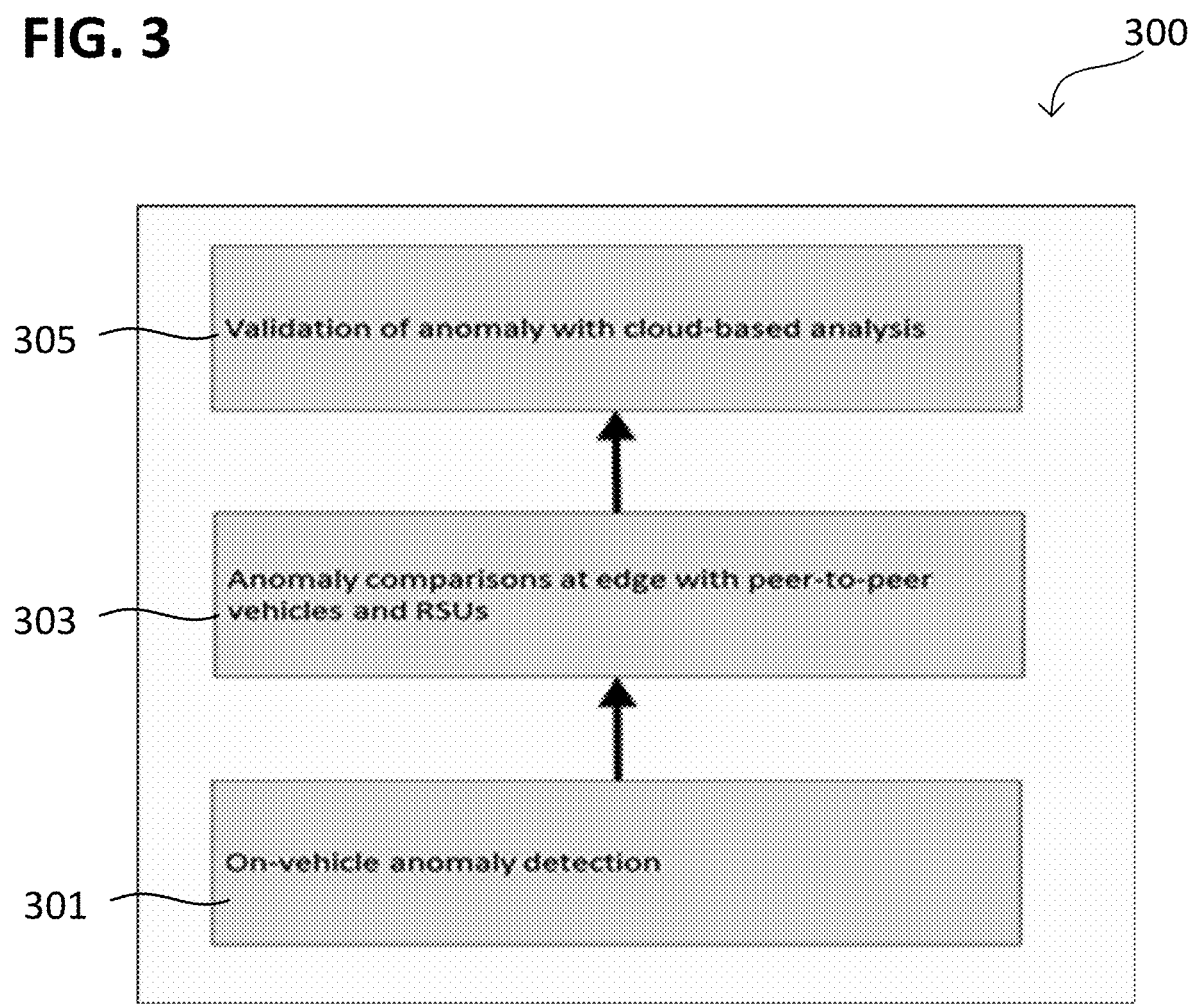
FIG. 3 shows the operation of the automotive alert detection system in a schematic flow diagram according to various aspects.

FIG. 3 illustrates the operation of the automotive alert detection system 200, e.g., the alert processing devices 222, in a schematic flow diagram 300 according to various aspects.

In 301, an anomaly may be detected by one or more controllers 114 (also referred as to anomaly detection 301). In 303 and 305, an anomaly validation may be performed by the automotive alert detection system 200, e.g., the APD 222. The anomaly validation 303, 305 may be performed in response to detecting the anomaly. Therefore, the APD 222 may receive information (also referred as to anomaly information) representing the anomaly from the one or more controllers 114, e.g., via the AM 210a. The anomaly information may, for example, include at least the information underlying the anomaly detection and/or the result of the anomaly detection.

A first anomaly validation may, in 303, include validating the anomaly information using information (also referred as to exterior information) representing an exterior vicinity of the automobile 100, e.g., by comparing the anomaly information with the exterior information. The exterior information may be received from one or more other vehicles, e.g., via a peer-to-peer communication network. Additionally or alternatively, the exterior information may be received from one or more other road side units (RSUs, also referred as to road side sensors). For example, the exterior information may be received via a wireless communication network (also referred as to mobile communication network), e.g., a peer-to-peer communication network or a vehicle-to-vehicle communication network (v2v communication network), a cellular communication network, as examples, or another wide range communication network.

Additionally or alternatively, a second anomaly validation may, in 305, include validating the anomaly information using information (also referred as to reference information) representing reference data of the automobile 100. The second anomaly validation may, in 305, include comparing the anomaly information with the reference information. The reference information may be stored in one or more automobile external databases, e.g., one or more external (e.g., stationary) computing devices (e.g., decentralized). Additionally or alternatively, the reference information may be part of a virtual automobile associated with the automobile 100 (also referred as to vehicle data avatar).

For example, the reference information may be received via the mobile communication network, e.g., from the one or more automobile external (e.g., stationary) computing devices, e.g., a cloud-based computing service. The computing device may provide the reference information to the automobile 100, e.g., the APD 222, on requesting the reference information. In other words, the second anomaly validation 305 is performed onboard the automobile 100.

Additionally or alternatively, the anomaly information may be sent via the mobile communication network, e.g., to the automobile-external computing device, e.g., a cloud based computing service. In this case, the computing device may perform the second anomaly validation 305 and return the result of the second anomaly validation 305 to the automobile 100, e.g., to the APD 222. The reference information and/or the anomaly information may be transmitted via the mobile communication network (also referred as to wireless communication network), e.g., a peer-to-peer communication network or a vehicle-to-vehicle communication network (v2v communication network), a cellular communication network, as examples, or another wide range communication network. In other words, the second anomaly validation 305 is performed externally from the automobile 100. In analogy, the first anomaly validation 303 may be, additionally or alternatively, performed externally to the automobile 100.

In response that the anomaly is validated, e.g., when the result of the first and/or second anomaly validation 303, 305 is positive (for example, if the anomaly is confirmed), the APD 222 may output the alert signal 222*d*. The information received for the first and/or second anomaly validation 303, 305 may be requested, e.g., via a request message send via the mobile communication network.

Illustratively, the first and/or second anomaly validation 303, 305 may provide a more advanced anomaly detection based on a more complex analysis, using data not stored on the vehicle (also referred as to vehicle external data).

Figure 4:
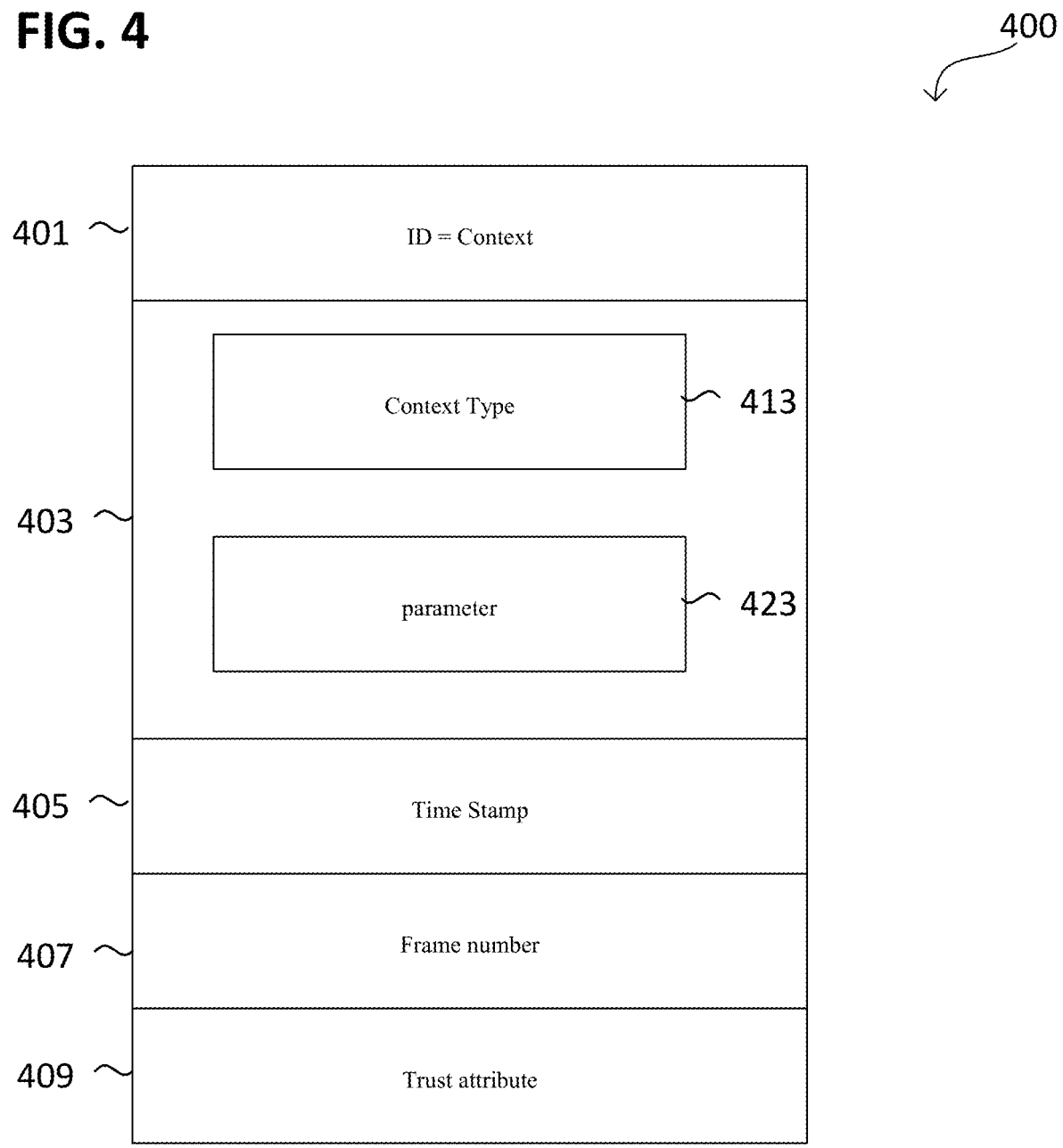
FIG. 4 shows the context message in a schematic architecture diagram according to various aspects.

FIG. 4 illustrates the context message (CM) 210*c* in a schematic architecture diagram 400 according to various aspects.

The context message 210*c* may include a message identifier (ID) 401 identifying the message as including contextual information 403. Additionally, the context message 210*c* may include the contextual information 403.

The contextual information 403 may include a type identifier 413 identifying the type of contextual information (also referred as to context type). For example, the automotive alert detection system 200 may include one or more CAN connected CB 116 of which each CB 116 is assigned to one or more context types and configured to provide one or more contexts of the assigned one or more context types. Each CB 116 may be configured to send a CM 210*c* via the CAN 112, wherein the CM 210*c* includes a type identifier 413 identifying the CM 210*c* to include contextual information of one context type as assigned to the CM 210*c*. For example, the CBAD-system 200 may be configured to provide one or more (e.g., two or more, e.g., three or more, e.g., four or more, e.g., five or more, e.g., ten or more, e.g., twenty or more) different context types of which each may be, for example, assigned to at least one CB 116 of the CBAD-system 200.

Optionally, the context type may be encoded, e.g., numerical or binary. For example, 8 bits or more may be reserved for encoding the context type. Optionally, the CAN communication protocol may be configured to support up to 256 bits (1 byte) for encoding various contexts.

The context information may generally represent the context of the automobile 100, e.g., including context information at least one of the following types: information of the automobile 100 itself (that is, its status, also referred as to internal information), information of the environment of the automobile 100 (also referred as to exterior information or environmental information), and/or information of the relationship between the automobile 100 and the environment of the automobile 100 (also referred as to relationship information). In other words, the context information may include information that is associated (e.g., related) with the specific automobile 100, and, for example, indicate changes of the automobile 100, e.g., in its environment, in its interior and/or in its relation to the environment. For example, the internal information may include the information representing the status of the automobile 100 (also referred as to status information).

In general, context information may include simple data types such strings, booleans, numbers, arrays and objects. Additionally or alternatively, context information may include more complex data types, such as function status, statistical data, sensor profiles, road details, traffic data, weather information, and time dependent information. The context information may correspond to (e.g., in consistence with) the automobile 100, e.g., its status (e.g., location, operation mode, occupation, its age, its type, driving speed, driving direction, temperature, or environment).

One or more context information of various types of context information may change in response to changes of the automobile 100 (e.g., driving speed), e.g., changes of the status of the automobile 100 and/or the relationship between the automobile 100 and the environment of the automobile 100. One or more context information of various types of context information may be invariant to changes of the automobile 100 (e.g., sensor profiles). One or more context information of various types of context information (e.g., the exterior information) may include information extrinsic to the automobile 100, e.g., representing its environment (e.g., traffic, road, temperature, or weather), e.g., the environment in front and/or behind of the automobile. One or more context information of various types of context information (e.g., the status information) may include information intrinsic to the automobile 100 (e.g., driving speed, driving direction, or constructional details). One or more context information of various types of context information may include information that originate from an exterior of the automobile 100. One or more context information of various types of context information may include information that originate from one or more sensors in the chassis 102 of the automobile 100. One or more context information of various types of context information may include information that originate from one or more sensors distant from the powertrain 106 of the automobile 100 and/or one or more sensors distant from the automobile 100 (also referred as to external sensor).

Examples for the context information may include automobile 100 inherent internal information, such as, for example, the type of the automobile 100, the age of the automobile 100, or constructional details of the automobile 100, e.g., type of powertrain, type of wheels, type of engine. Examples for the context information may include (e.g., admission or operating) requirement related internal information, such as, for example, allowed weight of the automobile 100, allowed speed of the automobile 100, or allowed occupation of the automobile 100. Examples for the context information may include occupation inherent internal information, such as, for example, occupation status (occupied or unoccupied), weight of passengers, or loading, number of passengers. Examples for the context information may include cruising inherent internal information, such as, for example, trip goal, driving direction, speed of the automobile 100 (also referred as to driving speed), or driving duration. Examples for the context information may include automobile 100 exterior information (also referred as to exterior information), such as, for example, type of the road, weather status, weather forecast, or environmental temperature. Examples for the context information may include operation mode related internal information, such as, operation mode (e.g., driving or stationary) of the automobile 100, operation mode of the engine (e.g., idle or busy, rotational frequency), operation mode of cruise control, or operation mode of autonomous driving assistant (or operation mode of another driving assistant). Examples for the context information may include traffic related exterior information, such as distance to another vehicle, or traffic density.

The environment of the automobile 100 may include or be formed from an exterior vicinity of the automobile 100 (that is outside the automobile 100), e.g., being within a distance from the automobile 100 of less than about 100 meter (m), e.g., of less than about 50 meter (e.g., 25 m, 10 m or 5 m).

For example, the contextual information may be associated with one or more sources that are not connected to (e.g., separated from) the CAN 112. Examples of the one or more sources may be sources within the automobile 100 (also referred as to internal or onboard sources) or sources external from the automobile 100 (also referred as to external sources). For example, the contextual information may represent the current contextual status of the automobile 100, e.g., beside information of the one or more automotive operating functions (e.g., powertrain related information).

The contextual information 403 may further include data 423 representing a quantity or parameter of the contextual information (also referred as to contextual parameter 423). The contextual parameter 423 may, for example, represent a quantity associated with the contextual information, e.g., a number, enumeration, size, value or the like.

The context message 210c may optionally include a time stamp 405, representing a chronological information associated with the context message 210c, e.g., a time of generating the context message 210c or a time of the context information 403, e.g., a time of determining the contextual parameter 423. For example, the time stamp 405 may include at least one of a date and time of day used in managing history.

The context message 210c may optionally include a frame number 407. The frame number 407 may include a counter (e.g., numerical value) that represents the number of events of sending a message (e.g., a context message 210c) via the CAN. For example, the frame number may be provided based on (e.g., in relationship to) a clock signal. For example, the frame number 407 may be configured to protect against replay of the context message 210c.

The context message 210c may optionally include a trust attribute 409. The trust attribute 409 may be configured to deter spoofing, tampering, and unauthorized reply, as examples. Therefore, the trust attribute 409 may include a trust identification of the CB 116, e.g., a digital signature of the CB 116.

For example, the context message 210c may include or be formed from one or more of the following data fields for information:
ID=Context;
Context Type;
Time Stamp;
Parameter Value; and
Frame number.

For example, the CAN 112, e.g., its communication protocol, and/or each controller 114 connected to the CAN 112 may be configured to support a verification of the trust attribute 409, e.g., a verification of one or more digital signatures.

Optionally, the CM 210c may be sent repeatedly, e.g., periodically (e.g., according to a frequency). For example, the CB 116 may be configured to send the CM 210c repeatedly, e.g., periodically. For example, the frame number may increase with each repeated sending of the CM 210c. Repeated CM 210c may, for example, be identical but include different frame numbers 407, for example, as long as the contextual information remains unchanged. For example, the CM 210c may be created and hardened (e.g., digital signed or otherwise proofed) by the CB 116 and broadcasted periodically.

For example, multiple CM 210c may be sent with a predefined frequency (also referred as to CM frequency), e.g., of less than about $1/100$ milliseconds (ms) or about $1/10$ second (s). For example, the CM frequency may be within a predefined frequency range, e.g., in a range of about $1/100$ ms to about $1/10$ s. Additionally or alternatively, immediately successive CM 210c may be distant in time from each other in a range of about 100 ms to about 10 s. Optionally, the CM frequency may be changed dynamically (also referred as to dynamic CM broadcasting), e.g., based on the context information. Illustratively, the CM frequency may be adjusted per context. For example, if the context information represents critical context (e.g., a challenging road condition, or an aggressive driving mode), the CM frequency may be changed, e.g., increased. Illustratively, several environments of the automobile 100, statuses of the automobile 100 and/or relationships between the automobile 100 and the environment of the automobile 100 may require more frequent updates. As an example, the CM frequency may be a first frequency, changed to a second frequency based on the context information (e.g., for a duration based on the context information), and optionally changed back to the first frequency (e.g., based on the context information).

Increasing the CM frequency may include to generate (e.g., send) one or more CM 210c (also referred as to out of sequence CM 210c) between two sucessive CM 210c that are in accordance with the first frequency. That is, the CM 210c excluding or before sending the out of sequence CM 210c may have a lower frequency than the CM 210c including the out of sequence CM 210c. The out of sequence CM 210c may represent the critical context as determined. Generating (e.g., sending) the one or more to out of sequence CM 210c, e.g., their number and/or sending frequency, may be based on the context information. Illustratively, one or more CM 210c may be propagated "out of sequence" in the case when important context changes (e.g., a critical condition) are detected by either the automobile 100 internal CB 116 or an automobile 100 external context module (e.g., as to context generation system) as described later in detail.

One or more (e.g., each) information 401, 403, 405, 407, 409 of the CM 210c may be encoded, e.g., numerical or binary.

An example of the CM 210c is:

```
{
  ID           = 132              // encoded "Context"
  Context Type = 11               // encoded "Operation Mode"
  Time Stamp   = 430897433        // ulong date and time
  Value        = 33               // encoded "Driving"
  Frame ID     = 11
  Trust        = "125cv6457..1o*&^*57" // Broadcaster digital signature
}
```

In response to at least one controller 114 of the one or more controllers 114 (e.g., a CAN connected system), such as a dash controller, determining that the context information 403 is inconsistent with the automotive function controlled by the controller (that is, an anomaly has been detected), the controller 114 may send one or more alert messages (AM) 210a as described in detail below.

Figure 5:
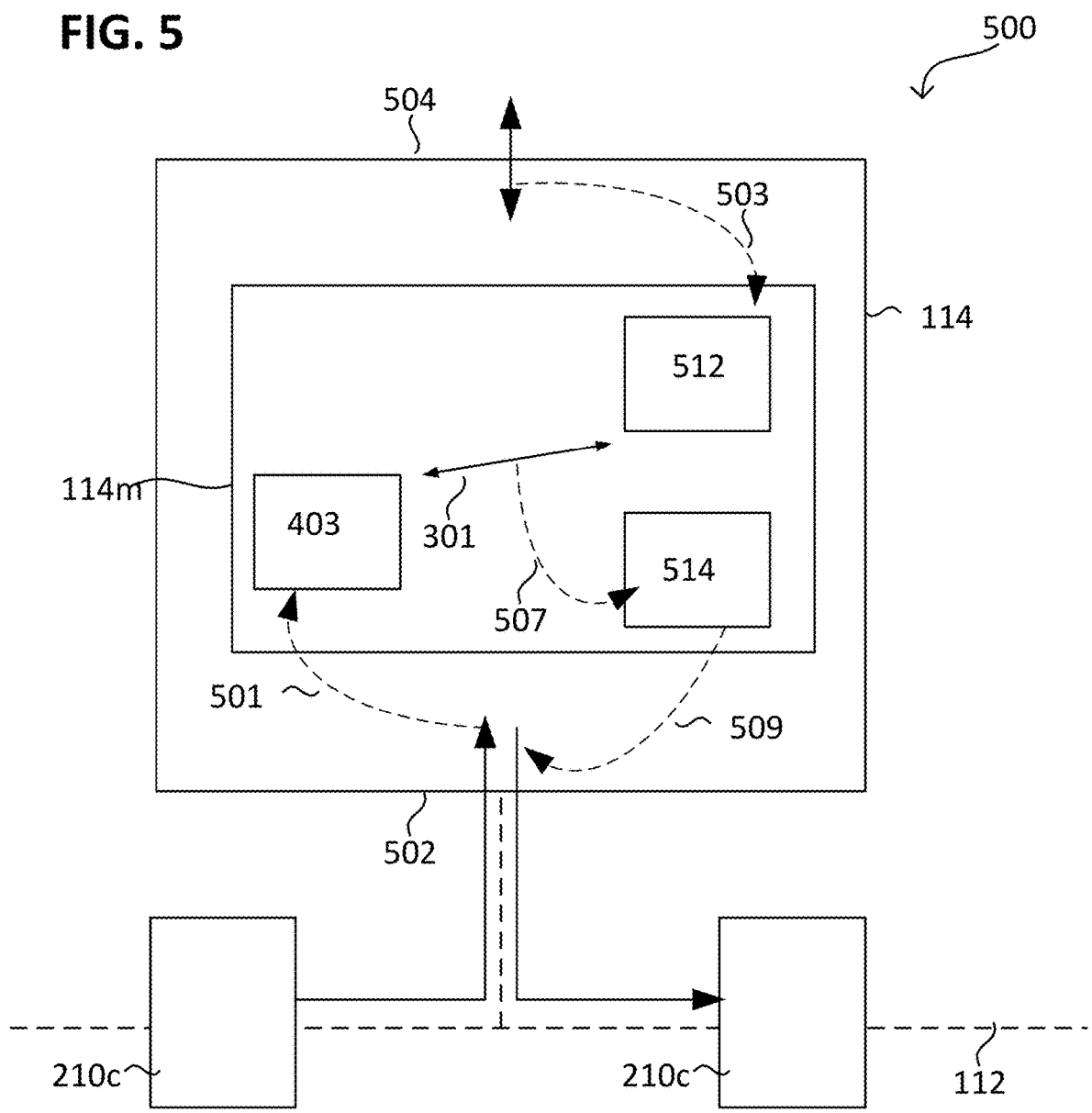
FIG. 5 shows a controller in a schematic processing diagram according to various aspects.

FIG. 5 illustrates a controller 114 in a schematic processing diagram 500 according to various aspects.

The controller 114 may include a first interface 502 (also referred as to fieldbus interface) configured to communicate in accordance with the automotive fieldbus communication protocol. The first interface 502 may include at least one of a decoder and an encoder that are configured in accordance with the automotive fieldbus communication protocol. The controller 114 may include a second interface 504 (also referred as to controlling interface) configured to control one or more actuators of the automobile 100, e.g. of powertrain. The controlling interface 504 (e.g., an analog communication interface) may, for example, include a signal output that is configured to output a drive signal for the one or more actuators, e.g., an analog drive signal or a digital drive signal. The controlling interface 504 may not necessarily support a message-based communication, but, for example, may be configured for another type of digital communication or for analogous communication. The controlling interface 504 may be configured to control one or more automotive operating functions that are provided by the one or more actuators. For example, the controller 114 may output a set point signal via the controlling interface 504 to set the one or more automotive functions to the set point by the one or more actuators.

The set point may be understood as the target (or desired status) for a parameter of the automotive operating function, or for a process parameter of the automotive operating function. Departure of such a variable from its set point is one basis for error-controlled regulation using negative feedback for automatic control. Via the feedback, the controller 114 may determine (e.g., sense or request) the current status of the automotive operating function, e.g., the value of the parameter, and provide a new set point based on the current status.

The controller 114 may, in 501, receive a CM 210c including context information. The fieldbus interface 502 may extract (e.g., decode) the context information from the CM 210c and provide the CM 210c to the anomaly detection module (ADM) 114m.

The controller 114 may, in 503, determine the (e.g., current) status 512 of the automotive function. For example, the status 512 of the automotive function (also referred as to function status 512) may be read out from a memory of the controller, sensed via a sensor that is configured for sensing the automotive operating function, requested via a message or the like.

The controller 114 may, in 301, determine whether a relation between the contextual information 403 and the function status 512 fulfills a predefined criterion (also referred as to anomaly detection 301). For example, the criterion may define a threshold for the function status 512 or for a numerical parameter that is dependent on the contextual information 403 and the function status 512.

Optionally, the criterion may be determined by the controller 114, e.g., in response to receiving the CM 210c and/or based on data stored in the memory of the controller 114. For example, the criterion may be determined using a rule that is stored in the memory of the controller 114. For example, the rule may include an algorithm (e.g., classification algorithm), mathematical formula or another logical relation. For example, the rule may be configured to convert the contextual information 403 (e.g., its contextual parameter 423) into the criterion, or output the criterion based on the contextual information 403 in another way. Additionally or alternatively, the criterion may be selected from a plurality of criterions, that, for example, is stored in the memory of the controller 114. For example, the selection may be based on the contextual information 403 (e.g., its contextual parameter 423).

In 507, the result 514 of the anomaly detection 301 may be provided. The result 514 may be obtained whether or not the criterion is fulfilled. For example, the results may include binary information, e.g., representing the cases of "fulfilled the criterion" and "not fulfilled the criterion" or an error code. Alternatively, the result 514 may include more complex information, for example, the relation between the contextual information 403 and the function status 512, the criterion, and the rule, the contextual information 403 itself, the function status 512 itself, as examples.

The case of determining that the relation does not fulfill the criterion may be also referred as determining (e.g., detecting) the anomaly event.

In response to determining that the criterion is not fulfilled, in 509, the AM 210a may be generated by the controller 114. Generating the AM 210a may include, encoding the result 514 of the anomaly detection 301 in accordance with the fieldbus communication protocol (e.g., CAN communication protocol). In other words, the controller may generate the AM 210a in response to determining that the received context information 403 is inconsistent (that is abnormal) to the status of the automotive function controlled by the controller 114. For example, the controller 114 may apply the anomaly determination 301 only to the automotive functions that are controlled by the controller 114.

Optionally, the controller 114 may be configured to determine the type of parameter of the function status to be determined based on the contextual information, e.g., in case the controller controls more than one parameter of the automotive function. For example, the type of parameter may be selected from a plurality of parameters that are used to control the automotive function. Additionally or alternatively, the controller 114 may be configured to determine the automotive function based on the contextual information, e.g., in case the controller controls more than one automotive function.

Optionally the CAN 112, e.g., its communication protocol, and/or each controller 114 connected to the CAN 112 may be configured to support that the AM 210a and/or CM 210c exceeds 8 bytes in size. For example, the message structure may require data exceeding 8 bytes (e.g., 8 bytes as mandated by CAN) to be transferred. Therefore, the CAN 112, e.g., its communication protocol, may be CAN-FD compatible. Alternatively, other communication protocol changes may be applied to exceed the 8 bytes message size limit of the CAN communication protocol. For example, the CAN 112, e.g., its communication protocol, and/or each controller 114 connected to the CAN 112 may be configured to support a payload (that is a data field) up to 64 bytes in size or more.

For example, the received contextual information 403 may indicate that the operation mode of the automobile 100 is "driving". For example, via the rule, the operation mode "driving" may be converted into a criterion representing that the "driving speed should be more than 0" (also referred as to speed criterion). Optionally, the controller 114 determines the parameter "driving speed" of the automotive function "speedometer" to be sensed. For example, if the status of the speedometer is determined by the controller 114 to be 0 (that is, the driving speed of automobile 100, e.g., the automobile 100 is stationary), the driving speed being "0" does not fulfill the speed criterion.

In response to determining that the driving speed being "0" does not fulfill the speed criterion being "driving speed should be more than 0", the AM 210a may be generated. For example, the AM 210a may include at least one of the following information (also referred as to anomaly information) representing the anomaly event: the driving speed being "0", the operation mode of the automobile 100 being "driving", and/or the speed criterion being "driving speed should be more than 0".

For example, the received contextual information indicates that the driving speed of the automobile 100 is "100 mph". For example, via the rule, the operation mode "100 mph" may be converted into the criterion "gear should be more than 2" (also referred as to gear criterion). Optionally, the controller 114 determines the parameter "current gear" of the automotive function "gear change" to be sensed. For example, if the status of the gear change may be determined by the controller 114 to be 1 (that is, the gear of automobile 100 is the first gear), the gear criterion may not be fulfilled.

In response to determining that the gear being "1" does not fulfill the gear criterion being "gear should be more than 2", the AM 210a may be generated. For example, the AM 210a may include at least one of the following anomaly information: the gear being "1", the operation mode of the automobile 100 being "100 mph", and/or the criterion being "gear should be more than 2".

Optionally, the criterion may be based on one or more exception rules representing a range or value for the function status, for which no anomaly will be detected (also referred as to anomaly exception) of the anomaly event will be ignored. For example, the one or more rules may be implemented raising an appropriate anomaly exception and/or defining one or more prevention action, e.g., do not go into diagnostic mode while driving speed is above 5 mph (miles per hour).

Figure 6:
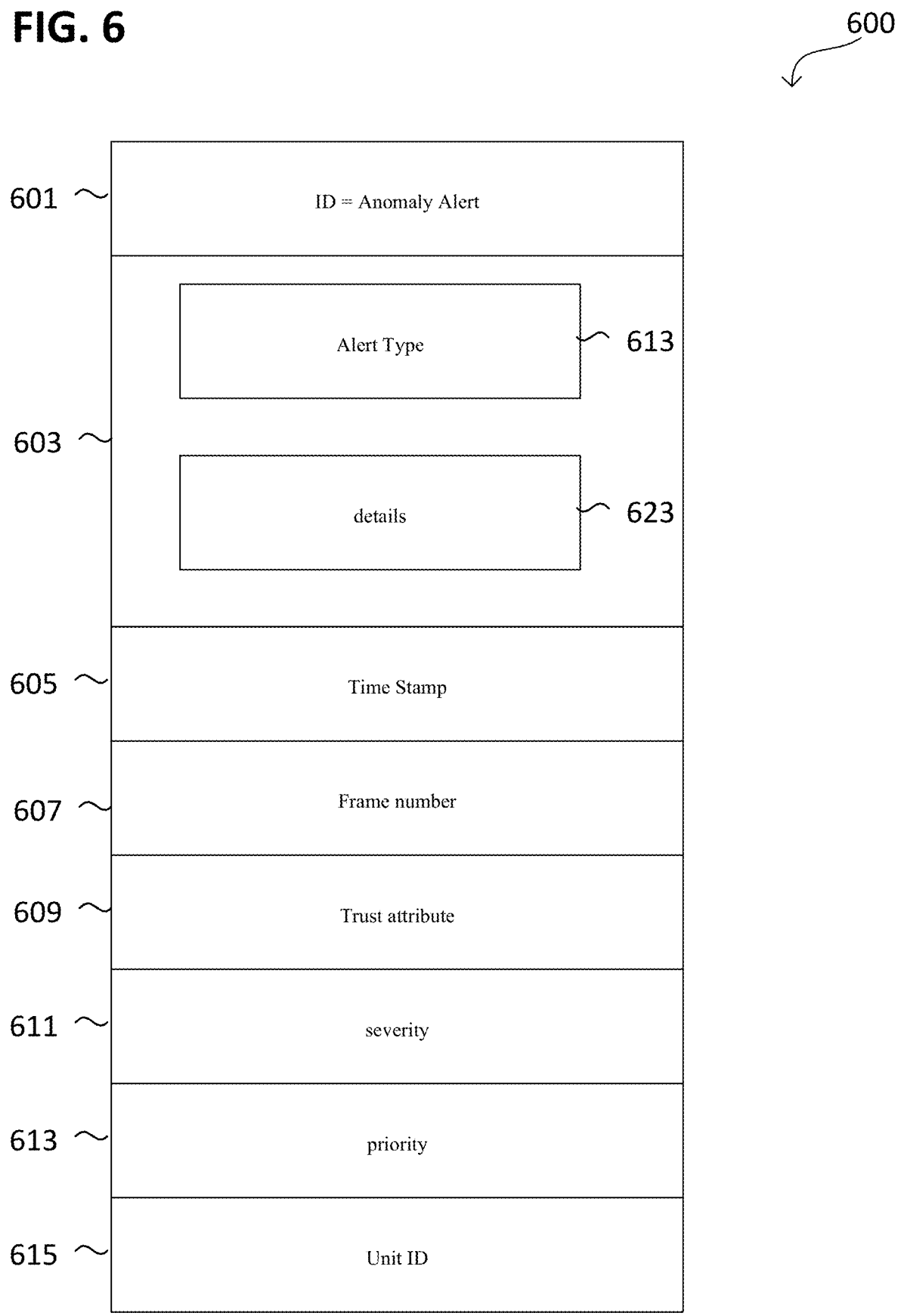
FIG. 6 shows an alert message in a schematic architecture diagram according to various aspects.

FIG. 6 illustrates the AM 210a in a schematic architecture diagram 600 according to various aspects.

The AM 210a may include a message identifier (ID) 601 identifying the AM 210a as including anomaly information 603. In other words, the message identifier may include information indicating that the anomaly event has been determined (that is, if the criterion is not fulfilled).

The alert information 603 may optionally include a type identifier 613 identifying the type of alert information 603 (also referred as to alert type). For example, the automotive alert detection system 200 may include one or more CAN connected controllers 114 of which each controller 114 is assigned to a controller type. For example, the CBAD-system 200 may be configured to provide one or more (e.g., two or more, e.g., three or more, e.g., four or more, e.g., five or more, e.g., ten or more, e.g., twenty or more) different controller types of which each may be, for example, assigned to one controller 114 of the CBAD-system 200. For example, the alert type may include one of the controller 114 specific predefined values as specified by the ECU/MCU manual, for example, such as "Anomaly Value", "Anomaly Message Type", "Message out of Sequence", "Unexpected Message".

The alert information 603 may include details 623 representing the anomaly event, e.g., including information representing a result of the anomaly detection. For example, the alert information 603 may include at least one of the following details representing the anomaly event: the status of the operating function controlled by the controller 114, the contextual information 403, e.g., the contextual parameter 623, and/or the criterion underlying the anomaly detection. For example, the details 623 may be provided in a free format byte sequence, that for example, may vary based on the alert type 613. For example, the details 623 may include data indicating the CM 210c (e.g., at least one of the message identifier 401 and/or the time stamp 405 of the CM 210c) that raised the anomaly event. For example, a format concatenation to the message identifier 401 and/or the time stamp 405 of the original context message 210c may be provided. Set more generally, the CM 210c and the AM 210a may be concatenated with each other, e.g., by the details 623 of the anomaly event.

The AM 210a may include information 615 (also referred as to unit ID) identifying the origin of the AM 210a, e.g., an identifier (e.g., network address, mac address or the like) of the controller 114.

The AM 210a may optionally include a time stamp 605, representing a chronological information associated with the anomaly information, e.g., a time of determining the anomaly event or a time of generating the AM 210a. For example, the time stamp 605 may include at least one of a date and time of day used in managing history.

The AM 210a may optionally include a frame number 607. The frame number 607 may include a counter (e.g., numerical value) that represents the number of events of sending a message (e.g., AM 210a) via the CAN. For example, the frame number may be provided based on (e.g., in relationship to) a clock signal. For example, the frame number 607 may be configured to protect against replay of the AM 210a.

The AM 210a may optionally include a trust attribute 609. The trust attribute 609 may be configured to prevent from spoofing, tampering, reply, as examples. Therefore, the trust attribute 609 may include a trust identification of the source of origin 114 (e.g., the controller 114), e.g., a digital signature of the controller 114.

The AM 210a may optionally include data 611 representing a severity of the anomaly event (also referred as to severity data 609). For example, the severity data 609 may be or represent one of "Normal", "Warning", "Critical", "Fatal". In other words, the severity data 609 may represent a potential impact of the on the automobile 100, e.g., on the CBAD-system 600.

The AM 210a may optionally include a priority indicator 613 indicating a priority of the AM 210a. For example, the priority indicator 613 may be or represent one of "High", "Medium", and "Low". In other words, the priority indicator 613 may represent the urgency of responding to the anomaly event, or illustratively, the urgency of handling (for example if not handled immediately, failure may occur in a very short time from now).

The AM 210a may include one or more of the following information:
  ID=Anomaly Alert;
  Unit ID;
  Time Stamp;
  Alert Type;
  Severity;
  Priority;
  Details; and
  Trust attribute.

For example, the CAN 112, e.g., its communication protocol, and/or each alert processing devices 222 connected to the CAN 112 may be configured to support a verification of the trust attribute 609, e.g., verification of digital signatures. For example, the AM 210a may be created by an ECU/MCU and forwarded to the higher level system over the CAN 222.

One or more (e.g., each) information 601, 603, 605, 607, 609, 611, 613 of the AM 210a may be encoded, e.g., numerical or binary.

Optionally, the priority indicator 613 may be based on at least one of the following: the alert information 603 (e.g., the details 623 representing the anomaly event or the type identifier 613), and the origin of the AM 210a. Illustratively, the priority indicator 613 may indicate a higher priority, if the alert information 603 and/or the origin of the AM 210a are determined to be critical.

An example of the AM 210a is:

```
{
    ID          = 133                       // encoded "Anomaly Alert"
    Unit ID     = 56                        // encoded "Gear Box"
    Time Stamp  = 430897433                 // ulong date and time
    Severity    = 1                         // encoded "Critical"
    Priority    = 1                         // encoded High
    Alert Type  = 2                         // encoded "Anomaly Value Detected"
    Details     = "100 mph while Gear = 1"
    Trust       = "125cv6457..1o*&^*57"     // ECU/MCU digital signature
}
```

In response to receiving the AM 210a, the APD 222 may perform one or more of predefined alert response schemas as described in more detail previously (see FIG. 3).

For example, the alert response schema may define one or more responses to determining the anomaly event or validating the anomaly event. For example, the alert response schema may define that in response to determining the anomaly event, a first alert signal 222d is output, e.g., by the APD 222. Additionally or alternatively, the alert response schema may define that in response to determining the anomaly event, the first anomaly validation 303 and/or second anomaly validation 305 may be performed, e.g., by the APD 222. Additionally or alternatively to outputting the first alert signal 222d, the alert response schema may define that in response that the anomaly is validated, a second alert signal 222d may be output, e.g., by the APD 222. The first alert signal 222d and/or the second alert signal 222d may include or be formed from an audio signal and/or a visual signal, e.g., output to the interior and/or exterior of the automobile 100 (e.g., recognizable of one or more passengers of the automobile 100). Additionally or alternatively, the first alert signal 222d and/or the second alert signal 222d may include or be formed from a command that causes the automobile 100 to change one or more automotive functions, e.g., slow down, full stop, start full automated cruising assistance, a safely pull over, and enter a predefined mode (e.g., safety mode or idle mode). The first alert signal 222d and/or the second alert signal 222d may include a notification send to a service center.

Figure 7:
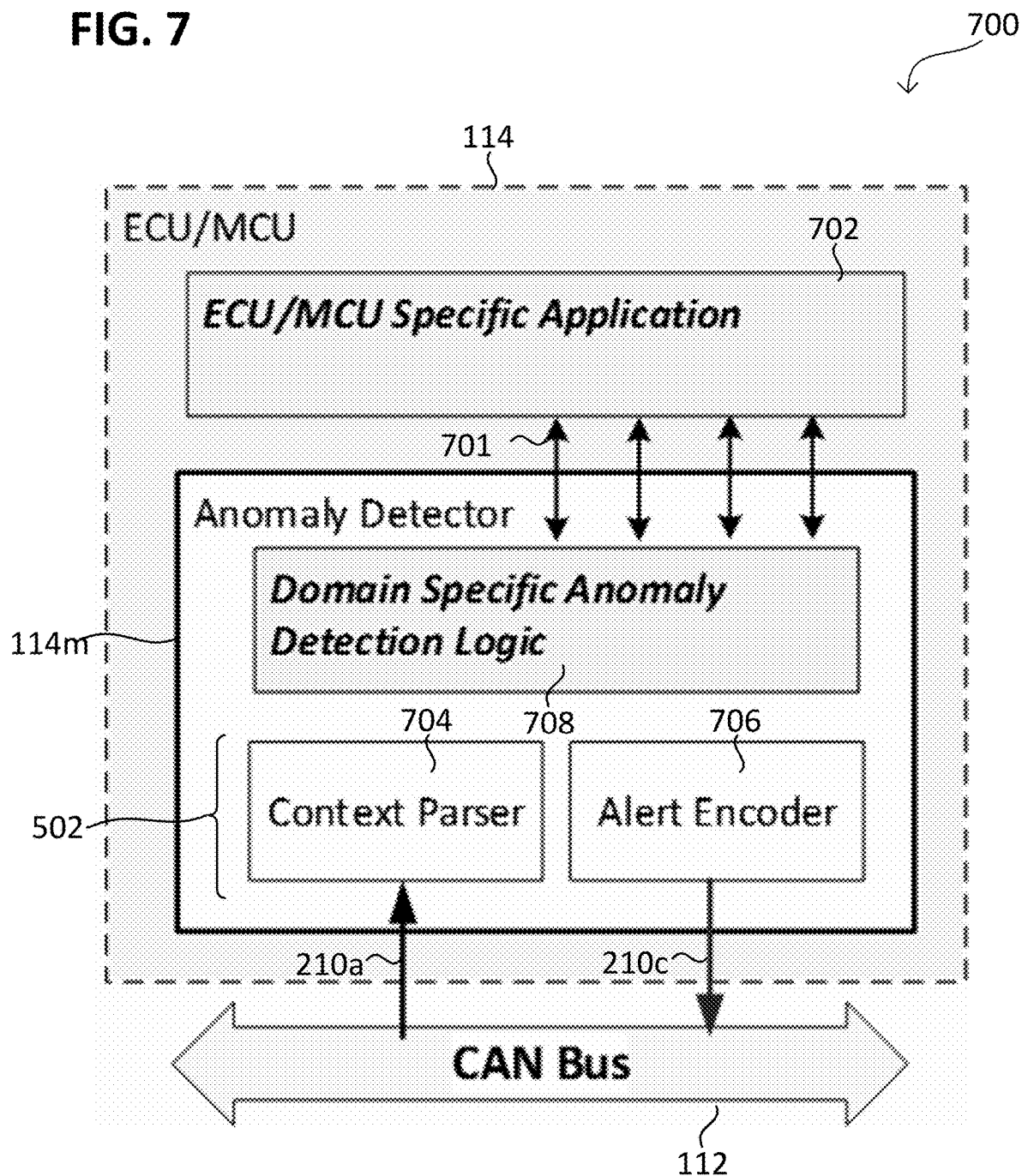
FIG. 7 shows a controller in a schematic processing diagram according to various aspects.

FIG. 7 illustrates a controller 114 in a schematic processing diagram 700 according to various aspects. The controller 114 may, for example, include or be formed from an ECU (electronic control unit) or MCU (Microcontroller).

The controller 114 may include one or more processors configured to control the automotive operating function. Controlling the automotive operating function may be provided by means of a controlling logic 702 (also referred as to controller 114 specific application 702). The controlling logic 702 may be implemented via software and/or hardware. Further, the controller 114 may include the ADM 114m configured to operate as follows.

In 701, the ADM 114m may request (e.g., trigger) the controlling logic 702 to provide the function status 512. For example, the controlling logic 702 may, e.g., via one or more sensors, determine the function status 512 and return the result of the determination to the ADM 114m.

The controller 114, e.g., the fieldbus interface 502, may include at least one (that is one or more than one) context parser 704. The context parser 704 may be configured to extract (e.g., decode and/or interpret) the context information from the CM 210c by parsing the CM 210c.

The controller 114, e.g., the fieldbus interface 502, may include at least one message encoder 706 (also referred as to alert encoder 706). The alert encoder 706 may be configured to generate (e.g., encode) the AM 210a in accordance with the fieldbus communication protocol by encoding the alert information 603. Thereby, the encoded alert information 603 may be included in the AM 210a to be send via the fieldbus 112.

The ADM 114m may include at least one domain specific anomaly detection logic 708 (also referred as to anomaly detection logic 708). The anomaly detection logic 708 may be configured to perform the anomaly detection based on the function status 512 and the extracted (e.g., parsed) context information.

For example, an ECU 114 and/or MCU 114 may be configured to implement internally a dedicated anomaly detection logic 708. The ADM 114m or at least the anomaly detection logic 708 may be configured as pluggable module. The anomaly detection logic 708 may be configured to understand (e.g., via interpretation) a standardized CM 210c and to broadcast a standardized AM 210a. The standardization of the CM 210c and/or AM 210a may be defined by the fieldbus communication protocol.

For example, the context parser 704 and alert encoder 706 may be part of or forming an adoption layer. The context parser 704 may be configured to retrieve ECU/MCU specific details from the standard CM 210a. For example, the context information as received via the CM 210a may be a general context information that is to be converted (e.g., simplified) to be further processed by the anomaly validation logic 708.

For example, the context parser 704 may be configured to convert the "general" or standardized context information as received via the CM 210a (also referred as to first CI) into controller 114 adapted context information (also referred as to second CI). The second CI may be a type of information that, in comparison to the first CI, may simplify being processed by the anomaly validation logic 708. For example, multiple types of first CI may be converted (e.g., by classification) into the same type of second CI representing the respective types of first CI. For example, each first CI representing a "driving speed" that differs from 0, e.g., being "driving speed=10 mph" or "driving speed=50 mph", may be converted into the second CI being "automobile operation status=driving". For example, each first CI representing a passenger is aboard, e.g., "passenger=3" or "passenger=1", may be converted into the second CI being "occupation status=occupied". For example, the second CI may include less details than the first CI.

For example, the second CI may be a binary information, e.g., representing "true" and "false".

Vice versa, the alert encoder 706 may be configured to translate the controller 114 (e.g., MCU) specific report (e.g., including the anomaly information) as received from the anomaly validation logic 708 into a standardized generic structure of the AM 210c and to send the AM 210c via CAN 112.

The domain specific anomaly detection module 114m may optionally provide for a callback enveloped program space, where additional code may be implemented, e.g., where an ECU/MCU developer may place the code checking potential anomalies.

An example for implementing the anomaly validation logic 708 is:

```
OnConextUpdate ( ) {
    If (Context.Speed<10 & GearNum>4) {
        ReportAnomaly ("GearBox", GetTime( ), Critical, High);
    }
    return;
}
```

The CBAD-system 700 may be configured to operate according to readings outside of contextual expectations, as operationalized in the "parameter values". If the information as provided by the one or more sensors of the automotive function exceed an allowable value (e.g., fulfills the criterion) for the context information, the MCU/ECU internal anomaly detection module 114m may report the issue by providing the anomaly information. The alert processing device 222 may, e.g., based on the alert response schema, determine the action of the automobile 100 to be performed, for example, a safety pull over and alert notification to the passengers and/or to the service center.

Additionally or alternatively, e.g., according to automobile 100 manufacturing design, the controller 114 (e.g., MCU/ECU) may take immediate action to prevent hazardous action in the current context. For example, the controller 114 may be configured to set the automotive function into a predefined mode as response to detecting the anomaly, e.g., an idle mode or safety mode.

The detailed criterion and/or rules for the anomaly detection 301, e.g., one or more parameter values and/or thresholds, may be defined by the manufacturer (e.g., during maintenance or upon manufacture) and/or may be updated by a cloud-based services. The detailed criterion and/or rules may reside in a protected ADM 114m, e.g., not subject to updates during driving.

Figure 8:
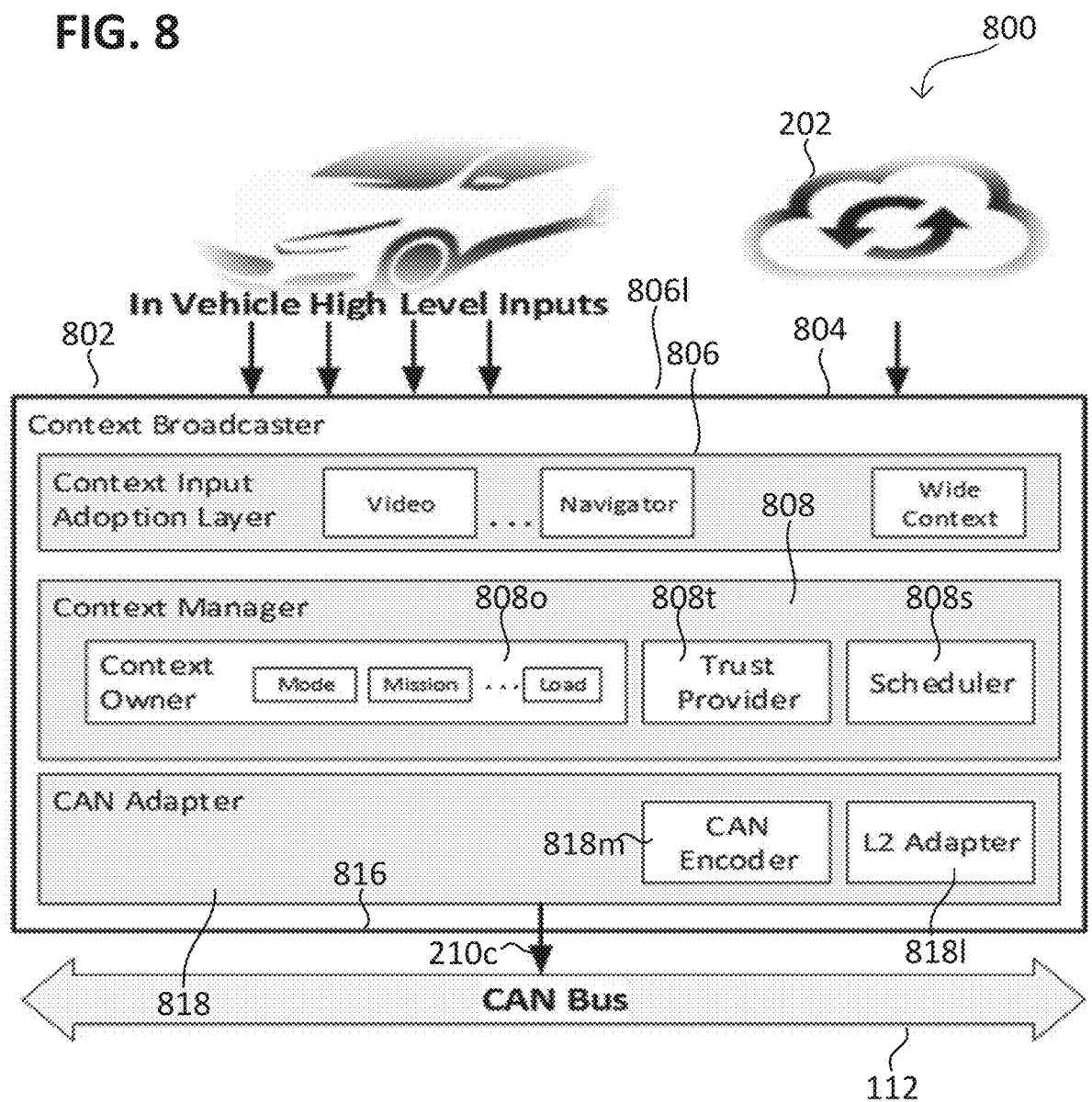
FIG. 8 shows a context broadcaster in a schematic processing diagram according to various aspects.

FIG. 8 illustrates a context broadcaster 116 in a schematic processing diagram 800 according to various aspects. The context broadcaster 116 may, for example, include or be formed from one or more processors.

The context broadcaster 116 may include a first interface 802 (also referred as to internal communication interface 802) configured to receive data from the one or more exterior vicinity sensors 108 of the automobile 100 and/or one or more occupation sensors of the automobile 100. The one or more exterior vicinity sensors 108 of the automobile 100 may be configured to sense an exterior vicinity of the automobile 100, e.g., the road, the driving direction, and the side or back of the automobile 100. In other words, the one or more exterior vicinity sensors 108 of the automobile 100 may be configured to sense a condition outside the automobile 100. The one or more occupation sensors may be configured to determine an occupation status and/or occupation number (e.g., passenger number) of the automobile 100.

The one or more exterior vicinity sensors 108 may provide the data representing the exterior vicinity of the automobile 1000 to the context broadcaster 116, e.g., video data, audio data, radar data, lidar data, navigational data. The one or more occupation sensors may provide the occupation status and/or occupation number of the automobile 100, to the context broadcaster 116. The data may be repeatedly sent by the one or more (e.g., exterior vicinity and/or occupation) sensors of the automobile 100.

For example, the one or more exterior vicinity sensors 108 of the automobile 100 may include at least one of the following sensors: dash camera, radar sensor, lidar sensor, obstruction sensor, cruise control sensor, approaching sensor, ultrasonic sensor, motion sensor, temperature sensor, as examples. The one or more (e.g., exterior vicinity and/or occupation) sensors, e.g., a device including the one or more sensors, may, for example, be separated from the CAN 112. For example, the data provided by the one or more (e.g., exterior vicinity and/or occupation) sensors may only be reported trough the CAN 112 via the context broadcaster 116.

Additionally or alternatively to the internal communication interface 802, the context broadcaster 116 may include a second interface 804 (also referred as to mobile communication interface 802) configured to receive data from a mobile communication network, e.g., a peer-to-peer communication network or a vehicle-to-vehicle communication network (v2v communication network), a cellular communication network, as examples. The data received via the mobile communication network may originate from a source external to the automobile 100 (also referred as to vehicle external source 202), e.g., from another vehicle, from a cloud-based service, from a roadside unit, as examples.

The internal communication interface 802 and/or the mobile communication interface 804 of the context broadcaster 116 may include an adoption layer 806. The adoption layer 806 may, for example, include a data parser and/or data decoder. For example, the adoption layer 806 may be configured to determine contextual information based on the data, e.g., extract (e.g., decode and/or parse) the contextual information and/or compute the contextual information.

For example, the dash camera may provide video data to the context broadcaster 116, on which basis the adoption layer 806 determines whether the automobile 100 is driving or not. For example, the roadside unit may provide traffic data to the context broadcaster 116, on which basis the adoption layer 806 determines whether the automobile 100 is driving or not. For example, the navigation system of the automobile 100 may provide location data and/or speed data to the context broadcaster 116, on which basis the adoption layer 806 determines whether the automobile 100 is driving or not. For example, the radar system of the automobile 100 may provide radar data to the context broadcaster 116, on which basis the adoption layer 806 determines whether the automobile 100 is driving or not. Also, other contextual information additionally or alternatively to "driving" or "not driving" may be determined, e.g., the driving speed, and driving direction.

The context broadcaster 116 may, optionally, include a context manager 808. The context manager 808 may be configured to handle multiple context information, e.g., from multiple automobile 100 external sources 202 and/or from multiple points in time. Additionally or alternatively, the context manager 808 may be configured to save the current context information and/or update context information with newly determined context information, e.g., via a context owner module 808o.

For example, the context manager 808 may be configured to validate the context information, e.g., based on old context information or context information of another type. For example, the context manager 808 may be configured to aggregate and/or consolidate multiple context information and provide the CM 210c based thereon.

For example, the context manager 808 may be configured to trigger sending a new CM 210c, e.g., in response to determining that the context information has changed or has been updated. Additionally or alternatively, the context manager 808 may be configured to trigger repeated (e.g., periodically) sending the same CM 210c, e.g., in response to determining that the context information has been maintained and/or unchanged. Additionally or alternatively, sending the CM 210c may be periodically or triggered by schedule, e.g., via a scheduler module 808s of the context manager 808. Additionally or alternatively, the scheduler module 808s may be configured to schedule requesting the data from the one or more external sources and/or from the one or more (e.g., exterior vicinity and/or occupation) sensors.

For example, the context broadcaster 116, e.g., the context manager 808, may be configured to trigger sending of multiple CM 210c with a predefined frequency (also referred as to CM frequency), e.g., of less than about 1/100 ms or about 1/10 s. For example, the CM frequency may be within a predefined frequency range, e.g., in a range of about 1/100 ms to about 1/10 s. Additionally or alternatively, the context broadcaster 116, e.g., the context manager 808, may be configured to trigger sending of immediately successive CM 210c within a time period in the range of about 100 ms to about 10 s. Optionally, the context broadcaster 116, e.g., the context manager 808, may be configured to change the CM frequency (also referred as to dynamic CM broadcasting), e.g., based on the context information. Illustratively, the CM frequency may be adjusted per context. For example, if the context broadcaster 116, e.g., the context manager 808, determines that the context information represent critical context (e.g., a challenging road condition, or an aggressive driving mode), the context broadcaster 116, e.g., the context manager 808, may change the CM frequency, e.g., by increasing the CM frequency.

For increasing the CM frequency, the context broadcaster 116, e.g., the context manager 808, may be configured to trigger sending of one or more CM 210c (also referred as to out of sequence CM 210c) between two directly successive CM 210c that are in accordance with the former CM frequency (that is, they have a higher frequency). Generating (e.g., sending) the one or more out of sequence CM 210c may be based on the context information. Illustratively, the context broadcaster 116, e.g., the context manager 808, may be configured to trigger one or more CM 210c "out of sequence" in the case when a critical context (or critical context change or a critical condition) is determined by the context broadcaster 116, e.g., the context manager 808. For example, determining the critical context (e.g., critical context change) by the context broadcaster 116, e.g., the context manager 808, may include computing the context information as received by the context broadcaster 116, e.g., the context manager 808, or may include receiving a notification about the critical context (e.g., critical context change). As example, the CM frequency may be a first frequency, changed to a second frequency based on the context information (e.g., for a duration based on the context information), and optionally changed back to the first frequency (e.g., based on the context information).

The context broadcaster 116 may include a third interface 816 (also referred as to fieldbus interface 816) configured to communicate (e.g., send and/or receive one or more messages) via the fieldbus 112 (e.g., CAN 112). The context broadcaster 116, e.g., the fieldbus interface 816, may include at least one message encoder 818m (also referred as to context encoder 818m). The context encoder 818m may be configured to generate (e.g., encode) the CM 210c in accordance with the fieldbus communication protocol by encoding the context information. Thereby, the encoded context information may be included in the CM 210c to be send via the fieldbus 112.

The context broadcaster 116, e.g., the fieldbus interface 816, may include a respective adapter 818l for the data link layer (e.g., according to the OIS model).

The context broadcaster 116, e.g., the fieldbus interface 816, may be configured to generate the CM 210c in accordance with the fieldbus communication protocol, wherein the CM 210c includes the contextual information 403 (see FIG. 4).

For example, the context broadcaster 116 may collect information coming from the high level systems (such as visual and audio recognition, navigation computer, radar/lidar object detector, as examples) installed in the automobile 100. The input data therefrom may be converted to a unified representation by one or more dedicated input adapters 806l implemented by the input adoption layer 806. Context related inputs may be handled by the context owner 808 in order to consolidate a best known context representation to share to the CAN 112 attached one or more controllers 114 (e.g., ECU/MCU) through the fieldbus (e.g., CAN) encoder 818m. The trust provider module 808t may be configured to sign the generated CM 210c and/or induce the one or more controllers 114 (illustratively, end points) to check the trustworthiness of the context information 403. For example, the scheduler module 808s may be configured to generate regular broadcasts via the CM 210c and/or broadcasts in response to detecting a context change in order to ensure immediate checks in the one or more controllers 114.

Figure 9:
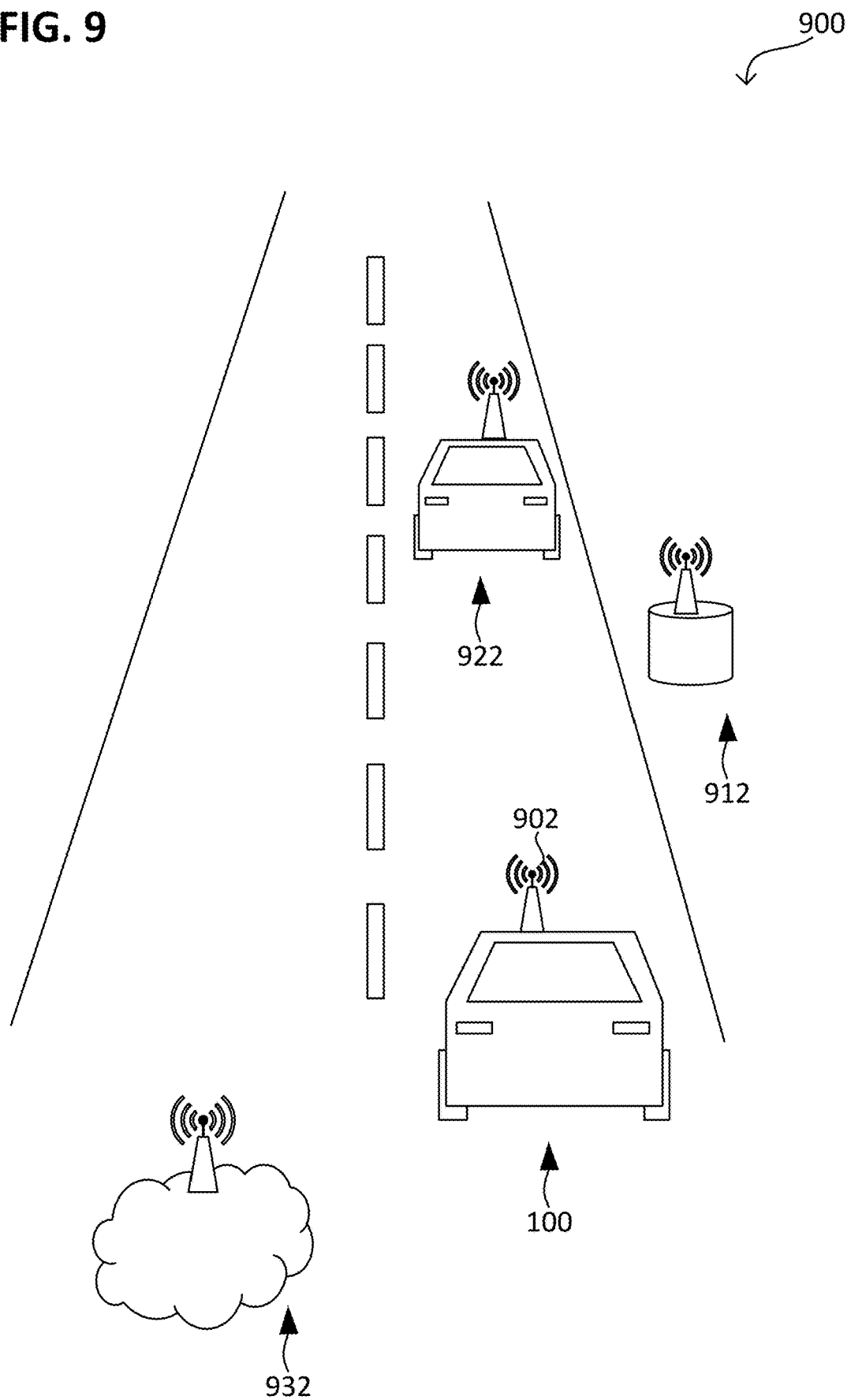
FIG. 9 shows examples for the wider context provider in a perspective diagram according to various aspects.

FIG. 9 illustrates external sources 932, 912, 922 used as WCP 202 in a perspective diagram 900 according to various aspects. The automobile 100, e.g., the CB 116 and/or the APD 222, may receive data from the one or more automobile 100 external sources 932, 912, 922. The automobile 100 may, for example the mobile communication interface of the CB 116 and/or the alert processing devices 222, include an antenna 902 for receiving the data from the one or more automobile 100 external sources 932, 912, 922.

The one or more automobile 100 external sources 932, 912, 922 may include a cloud-based service 932. Additionally or alternatively, the one or more automobile 100 external sources 932, 912, 922 may include a stationary roadside unit 912 (RSU). Additionally or alternatively, the one or more automobile 100 external sources 932, 912, 922 may include one or more other vehicles 922, e.g., other automobiles 922.

For example, the cloud-based service 932 may include a bridging system for connecting the automobile 100 to an infrastructure services such as a cloud-based vehicle data avatar. The vehicle data avatar may include data of the automobile 100, which was determined and stored earlier and/or which was provided by the manufacturer.

The mobile communication network may, for example, include a cellular infrastructure. The or each WCP 202 may be configured to provide a standardized structure including marked context parameters for use by context broadcaster 116. Also another mobile communication network may be used for receiving the data (e.g., exterior information).

Figure 10:
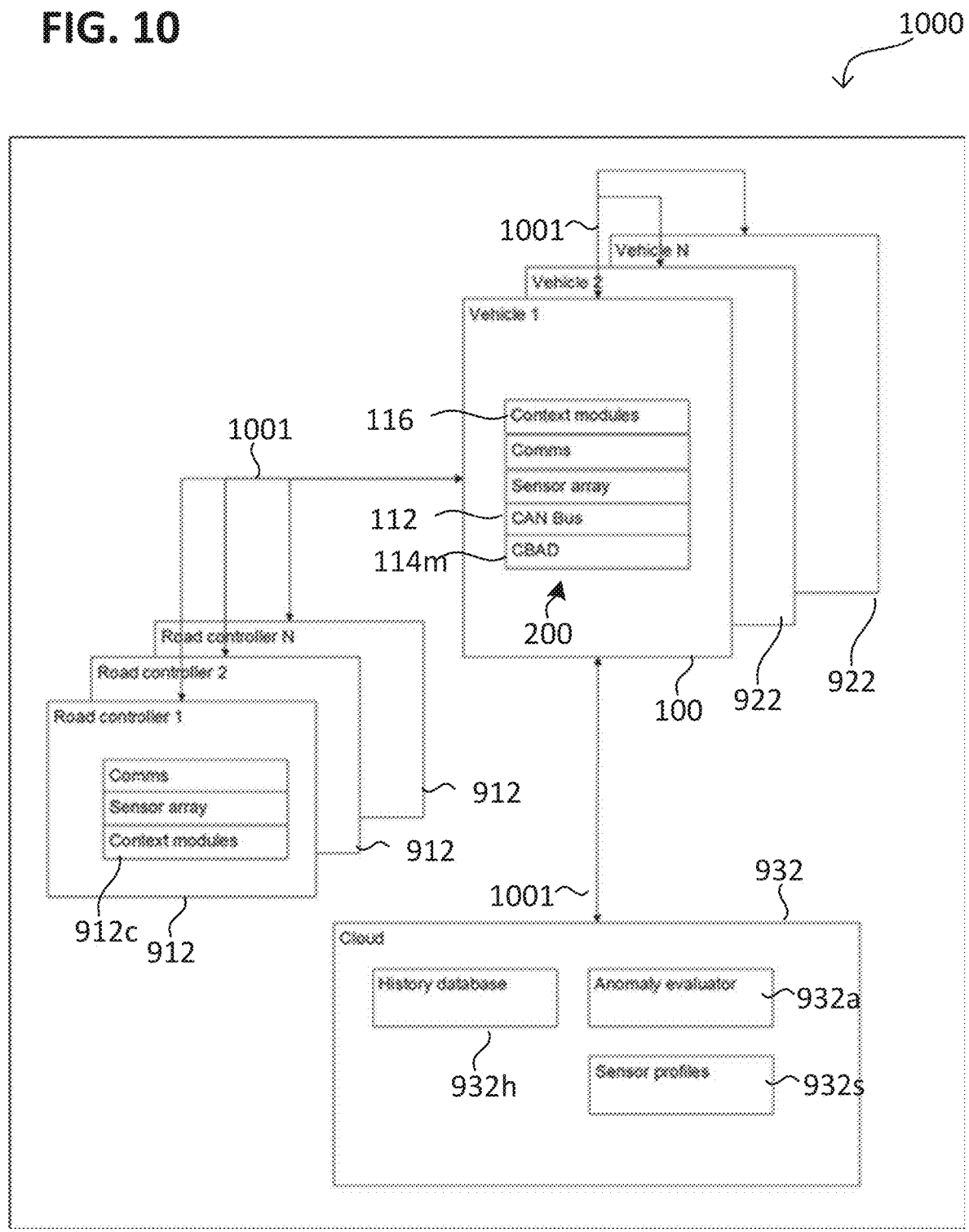
FIG. 10 a communication system in a schematic processing diagram according to various aspects.

FIG. 10 illustrates a communication system 1000 in a schematic processing diagram 1000 according to various aspects. The communication system 1000 may include the automobile 100 including the CBAD-system 200. The CBAD-system 200 may include one or more CB 116 and may include one or more ADM 114*m* connected by a fieldbus 112 (e.g., CAN). The CBAD-system 200 may optionally include one or more mobile communication interfaces (comms) and/or one or more exterior vicinity sensors 108 (e.g., a sensor array), e.g., being onboard the automobile 100.

The communication system 1000 may optionally include one or more external sources 932, 912, 922, e.g., one or more cloud-based services 932, one or more other vehicles 922, and/or RSU 912 (e.g., road controller). Each external source 932, 912, 922 may include a mobile communication interface (comms) to communicate with the automobile 100 via the mobile communication network 1001, e.g., sending data to the automobile 100. For example, the CBAD-system 200 may, via the mobile communication interface, be communicatively coupled to the one or more external sources 932, 912, 922.

Optionally, the or each RSU 912 may include one or more sensors (e.g., a sensor array) for sensing the road and/or the traffic. Optionally, the or each RSU 912 may include a context module 912*c* that is configured to determine the contextual information based on data received from the one or more sensors of the RSU 912 (in analogy to the CB 116), and send the determined contextual information to the automobile 100.

Optionally, each other vehicle 922 may include one or more sensors (e.g., a sensor array) for sensing the automobile 100. Optionally, each other vehicle 922 may include a context module that is configured to determine the contextual information based on data received from the one or more sensors of the other vehicle 922 (in analogy to the CB 116), and send the determined contextual information to the automobile 100. For example, each other vehicle 922 may include a CBAD-system 200 similar to the automobile 100, wherein the multiple CBAD-systems 200 provide data to each other.

The context module of each other vehicle 922 and/or each RSU 912 may be configured to determine a critical context of the automobile 100, e.g., a challenging road condition or an aggressive driving mode, and transmit a notification about the critical context to the automobile 100. The automobile 100 (e.g., the CB 116) may be configured to increase the CM frequency (e.g., by generating one or more to out of sequence CM 210*c*) in response to receiving the notification about the critical context.

The data provided by at least one of the one or more external sources 932, 912, 922 may be requested for anomaly validation 303, 305 (see FIG. 3) as described above. Additionally or alternatively, the data provided by at least one of the one or more external sources 932, 912, 922 may be processed by the CB 116 of automobile 100 to provide the contextual information, which is to be sent via the fieldbus 112 of the automobile 100.

Optionally, each cloud-based service 932 may include one or more of the following data provider: a history database 932*h*, an anomaly evaluator 932*a* and/or one or more sensors profiles 932*s*. The history database 932*h* may be configured to provide (e.g., chronologically sorted) data associated with the automobile 100. Each sensor profile 932*s* may be configured to provide data assigned to a sensor of the automobile 100, e.g., including information representing the performance, e.g., over time or in dependency of environmental conditions (e.g., temperature) of the assigned sensor. The anomaly evaluator 932*a* may be configured to provide an automobile 100 external anomaly validation, e.g., based on the anomaly information as sent from the automobile 100 to the cloud-based service 932. For example, the anomaly validation may be performed externally from the automobile 100 by an automobile-external computing device, e.g., a server. The anomaly evaluator may be configured to send the results of the anomaly validation (as performed externally from the automobile 100) to the automobile 100.

The communication system 1000 may support advanced anomaly detection capabilities as described in detail below.

The communication system 1000 may provide more than anomaly detection applied to data of the automobile 100. The in-vehicle CBAD-system 200 provides, for example, cross-vehicle and/or RSU 912 communication. For the anomaly detection based on the context information described above, the CBAD-system 200 may be applied to an automobile 100, but additionally or alternatively, the context analysis (e.g., the anomaly validation 303, 305) may be performed by one of the following: edge (within or by one or more RSU 912), e.g., peer to peer (with or by one or more other vehicles 922), or the cloud 932. Depending on the analysis to be performed, some comparisons may or may not be appropriate. For example, cars facing away from each other would not likely have lidar data for comparison, while radar may be relevant, but lidar comparison across cars and RSUs with similar views may be relevant. For example, if the data on the automobile 100 does not fulfill the criterion (e.g., exceed predefined limits) in the local (onboard the automobile 100) analysis, additionally, the cloud-based context analysis (e.g., the anomaly validation 303, 305) may not be triggered, thus keeping wireless network connections from expanding exponentially.

An extended level of context analysis (e.g., beyond local analysis on the automobile 100) may provide for extended validation. For example, an apparent anomaly event at the automobile 100 (that is at local level) may be a false positive due to extreme contextual conditions, which may be resolved with comparisons with at least one of the peer-to-peer vehicles, road side units (RSUs), or cloud data. Additionally or alternatively, an attack at various levels in the architecture of the automobile 100 may be detected by comparing onboard context analysis with the cloud-based context analysis. For example, an area network attack may not be suitable for real-time contextual detection at an RSU 912 if the locality is affected, but a cloud-based comparison of historical data may be relevant.

For example, in a first stage of contextual anomaly detection 301, a content (e.g., either individual sensor data points or sequences of data points) may be scanned for exceptions based on factors such as exceeding simple thresholds, standard deviations, and unusual sequences. Such a first stage of contextual anomaly detection 301 may be implemented computationally simple and can be processed onboard the automobile 100 (that is, processed locally). For example, a field programmable gate array (FPGA) connected with the fieldbus 112 (e.g., CAN), or another low-level module, may be configured to perform the first stage of contextual anomaly detection 301. A second stage of contextual anomaly detection 301, one or more exceptions derived by the first stage of contextual anomaly detection 301 may be analyzed using contextual information (such as one or more sensors profiles) and/or comparisons with like-sensor data previously determined in the same context of the automobile 100. For example, an anomalous data sequence (as determined locally) of a sensor is compared against previously and/or randomly selected sequences from the same sensor or like-sensors received from cloud-based data. In another example, a sensor reading (e.g., data therefrom) may be compared to readings from like-sensors at the same temperature (or under another identical environmental condition). One or more factors and sizes of data sequences can be analyzed in such a second stage of contextual anomaly detection 301. For example, a recurrent neural network (RNN) may be trained on time-sequence data in order to estimate probabilities of various sequences. Additionally or alternatively, the second stage of contextual anomaly detection 301 may use scheduling data and power level data.

According to various aspects, one or more attacks at various levels in the architecture of the automobile 100 may be suitable for detection of an anomaly, for example, by comparing local data with cloud data (e.g., an area network attack may not be suitable for real-time contextual detection at the edge, but a cloud-based comparison of historical data may be relevant). If an actual attack has infected a sensor within the automobile 100, it is unlikely that the same attack would re-write data stored in a cloud-based secure system. Thus, anomalous sensor data could be verified there. Additionally or alternatively, if unusual contextual variables occur, such as extreme temperature or flooding, the historical data could be checked against the local contextual readings.

For example, onboard components of the automobile 100 may be implemented as an add-on extension of the context broadcaster 116 or implemented as an independent CAN attached ECU.

Further, various aspects will be described in the following examples.

In example 1, a method for (e.g. automotive internal) communication is disclosed, including: controlling, e.g., by a controller, an automotive operating function representing an operation of an actuator of an automobile; receiving, e.g., by the controller, a first message (e.g., a CM) in accordance with an (e.g., automotive) fieldbus communication protocol via an (e.g., automotive) fieldbus communication network, wherein the first message includes contextual information associated with the automobile; determining, e.g., by the controller, whether a relation between the contextual information and a status of the automotive operating function fulfills a predefined criterion; generating, e.g., by the controller, a second message (e.g., a AM) in accordance with the (e.g., automotive) fieldbus communication protocol, wherein the second message includes information representing a result of the determination.

In example 2, the method of example 1 is disclosed, wherein the automotive operating function is a powertrain operating function representing an operation of a powertrain of the automobile (e.g., the powertrain including the actuator).

In example 3, the method of example 1 or 2 is disclosed, wherein the automotive operating function is an engine operating function representing an operation of an engine of the automobile (e.g., the engine including the actuator).

In example 4, the method of one of examples 1 to 3 is disclosed, wherein the automotive operating function is a gear operating function representing an operation of an gear of the automobile (e.g., the gear including the actuator).

In example 5, the method of one of examples 1 to 4 is disclosed, wherein the contextual information are associated (e.g., correlated) with the automotive operating function.

In example 6, the method of one of examples 1 to 5 is disclosed, wherein the (e.g., automotive) fieldbus communication network includes a Controller Area Network, optionally with Flexible Data-Rate; and/or wherein the (e.g., automotive) fieldbus communication protocol is a Controller Area Network communication protocol.

In example 7, the method of one of examples 1 to 6 is disclosed, wherein the (e.g., automotive) fieldbus communication network includes at least one of the following types of networks of: a Controller Area Network; a Local Interconnect Network; and a FlexRay Network.

In example 8, the method of one of examples 1 to 7 is disclosed, wherein the first message includes further at least one (that is one or more) of the following: a message identifier identifying the message as including contextual information; a frame number; a time stamp (e.g., of the contextual information); and/or a trust attribute.

In example 9, the method of one of examples 1 to 8 is disclosed, wherein the contextual information include further at least one of the following: a type identifier identifying the type of contextual information; data representing a parameter of the contextual information (e.g., its quantity).

In example 10, the method of one of examples 1 to 9 is disclosed, wherein the contextual information include contextual information of at least one of the following type of contextual information: information of the environment of the automobile (also referred as to exterior information), e.g., information representing an exterior vicinity of the automobile; information of the relationship between the automobile and the environment of the automobile; information of the automobile itself; information associated with data about the automobile stored in a database (also referred as to reference information); information associated with a road underlying the automobile (also referred as to roadside information); information originating from a manufacturer of the automobile (also referred as to manufacturer information); information representing (e.g., indicating) an operation mode of the automobile (also referred as to operation mode information); information representing an occupation of the automobile with passengers (also referred as to occupation information); information associated with navigating the automobile (also referred as to navigation information); information representing a load of the automobile (also referred as to loading information).

In example 11, the method of one of examples 1 to 10 is disclosed, wherein the second message includes further at least one of the following: information indicating a status of the automotive (e.g., powertrain) operating function; information indicating that an anomaly event associated with the automotive operating function has been determined, wherein the anomaly event represents that the relation between the contextual information and the status of the automotive operating function does not fulfills the predefined criterion.

In example 12, the method of one of examples 1 to 11 is disclosed, wherein the second message includes further at least one of the following: a message identifier identifying the message as including anomaly information; a type identifier identifying the type of anomaly event; information identifying the origin of the second message; a priority indicator indicating a priority of the second message; the contextual information; data representing a severity of the anomaly; a frame number; a time stamp (e.g., of the contextual information); and/or a trust attribute.

In example 13, the method of one of example 12 is disclosed, wherein the priority indicator is determined based on at least one of: the first message (e.g., the contextual information), the type of anomaly event, a type of the automotive operating function, and/or the result of the determination, e.g., a combination thereof.

In example 14, the method of one of examples 1 to 13 is disclosed, wherein controlling of the automotive operating function is based on a communication (e.g., including one or more messages received) in accordance with the (e.g., automotive) fieldbus communication protocol via the (e.g., automotive) fieldbus communication network.

In example 15, the method of one of examples 1 to 14 is disclosed, further including: determining the relation between the contextual information and the status of the automotive operating function; wherein preferably the relation includes or is formed from a mathematical relation.

In example 16, the method of one of examples 1 to 15 is disclosed, further including: determining the predefined criterion based on the contextual information, wherein preferably determining the predefined criterion includes choosing the predefined criterion out of a plurality of predefined criterions stored in the controller, of which each, for example, is associated with a type of the contextual information; wherein preferably the predefined criterion represents a range for the status of the automotive operating function to be fulfilled.

In example 17, a controller is disclosed, including one or more processors configured to perform the method of one of examples 1 to 16, and/or, including one or more processors configured to: control an automotive operating function representing an operation of an actuator of an automobile; receive a first message (e.g., a CM) in accordance with an (e.g., automotive) fieldbus communication protocol via an (e.g., automotive) fieldbus communication network, wherein the first message includes contextual information associated with the automobile (e.g., the automotive operating function); determine whether a relation between the contextual information and a status of the automotive operating function fulfills a predefined criterion; generate a second message (e.g., a AM) in accordance with the (e.g., automotive) fieldbus communication protocol, wherein the second message includes information representing a result of the determination.

In example 18, the controller of example 17 is disclosed, further including: a first interface configured to communicate in accordance with the (e.g., automotive) fieldbus communication protocol; and/or a second interface for controlling the automotive (e.g., powertrain) operating function, e.g., via a modulated signal, wherein preferably the modulation represents the a set point of controlling the automobile.

In example 19, the controller of example 17 or 18 is disclosed, further including: the second interface for sensing the status of the automotive operating function, e.g., via one or more sensors configured to sense the status of the automotive operating function.

In example 20, an automotive operation system (e.g., a powertrain system) is disclosed, including: the controller of one of examples 17 to 19; the actuator coupled with the controller, wherein the actuator is controlled by the controller and/or configured to change the status of (e.g., to manipulate) the automotive operating function.

In example 21, the automotive operation system of example 20 is disclosed, further including: one or more sensors coupled with the controller, wherein the one or more sensors are configured to sense the status of the automotive operating function and/or to return the status of the automotive operating function to the controller.

In example 22, a means for (e.g. automotive internal) communication is disclosed, including: means for controlling an automotive operating function representing an operation of an actuator of an automobile; means for receiving a first message (e.g., a CM) in accordance with an (e.g., automotive) fieldbus communication protocol via an (e.g., automotive) fieldbus communication network, wherein the first message includes contextual information associated with the automobile; means for determining whether a relation between the contextual information and a status of the automotive operating function fulfills a predefined criterion; means for generating a second message (e.g., a AM) in accordance with the (e.g., automotive) fieldbus communication protocol, wherein the second message includes information representing a result of the determination.

In example 23, a method for (e.g. automotive internal) communication is disclosed, including: receiving data from one or more sensors of an automobile, wherein the data represent environmental information associated with an exterior vicinity of the automobile and/or represent an occupation of the automobile by one or more passengers; determining contextual information based on the data (e.g., by classification); generating a message (e.g., the CM) in accordance with an (e.g., automotive) fieldbus communication protocol, wherein the message includes the contextual information.

In example 24, the method of example 23 is disclosed, wherein the data includes sensor data that represents at least one of the following: an operation mode of the automobile; an occupation of the automobile; a navigation process of the automobile; a loading of the automobile; visual (e.g., optical, video and/or image) information; radar information; lidar information; ultrasonic information; object detection information; obstruction information; the environment (e.g., traffic, road, temperature, or weather) of the automobile, e.g., the environment in front and/or behind of the automobile.

In example 25, the method of example 23 or 24 is disclosed, wherein the data include raw sensor data.

In example 26, the method of one of examples 23 to 25 is disclosed, wherein a frequency of the generating the message is changed based on the contextual information.

In example 27, the method of one of examples 23 to 26 is disclosed, wherein the (e.g., automotive) fieldbus communication network includes a Controller Area Network, optionally with Flexible Data-Rate; and/or wherein the (e.g., automotive) fieldbus communication protocol is a Controller Area Network communication protocol.

In example 28, the method of one of examples 23 to 27 is disclosed, wherein the (e.g., automotive) fieldbus communication network includes at least one of the following types of networks of: a Controller Area Network; a Local Interconnect Network; and a FlexRay Network.

In example 29, the method of one of examples 23 to 28 is disclosed, wherein the message includes further at least one of the following: a message identifier identifying the message as including contextual information; a frame number; and/or a time stamp (e.g., of the contextual information); a trust attribute.

In example 30, the method of one of examples 23 to 29 is disclosed, wherein the contextual information include further at least one of the following: a type identifier identifying the type of contextual information; data representing a parameter of the contextual information (e.g., its quantity).

In example 31, the method of one of examples 23 to 30 is disclosed, wherein the determining of the contextual information is further based (e.g., by consolidation) on further information, wherein preferably the further information includes information of at least one of the following type of information: information of the environment of the automobile (also referred as to exterior information), e.g., information representing an exterior vicinity of the automobile; information of the relationship between the automobile and the environment of the automobile; information of the automobile itself; reference information associated with data about the automobile stored in a database; roadside information associated with a road underlying the automobile; manufacturer information; operation mode information; occupation information representing an occupation of the automobile; navigation information associated with the automobile; loading information of the automobile.

In example 32, a context broadcaster is disclosed, including one or more processors configured to perform the method of one of examples 23 to 31 and/or, including one or more processors configured to: receive data from one or more sensors of an automobile, wherein the data represent environmental information associated with an exterior vicinity of the automobile; determine contextual information based on the data; generate a message (e.g., the CM) in accordance with an (e.g., automotive) fieldbus communication protocol, wherein the message includes the contextual information.

In example 33, the context broadcaster of example 32 is disclosed, further including: a first interface configured to communicate in accordance with the (e.g., automotive) fieldbus communication protocol.

In example 34, the context broadcaster of example 32 or 33 is disclosed, further including: a second interface for communication with the one or more sensors, e.g., for receiving sensor data from the one or more sensors.

In example 35, a (e.g., automotive) broadcasting arrangement is disclosed, including: the context broadcaster of one of examples 32 to 34; the one or more sensors coupled with the context broadcaster, wherein preferably, the one or more sensors include at least one of the following sensor types: an occupation sensor of the automobile; a navigation (e.g., position, height and/or direction) sensor of the automobile; visual (e.g., optical, video and/or image) sensor; radar sensor; lidar sensor; ultrasonic sensor; object detection sensor; obstruction sensor.

In example 36, means for (e.g. automotive internal) communication are disclosed, including: means for receiving data from one or more sensors of an automobile, wherein the data represent environmental information associated with an exterior vicinity of the automobile; means for determining contextual information based on the data; means for generating a message (e.g., the CM) in accordance with an (e.g., automotive) fieldbus communication protocol, wherein the message includes the contextual information.

In example 37, a method for (e.g. automotive internal) communication is disclosed, including: receiving data in accordance with the mobile network communication protocol via a mobile communication network, wherein the data represent contextual information associated with the automobile; determining the contextual information based on the data; generating a message (e.g., the CM) in accordance with the fieldbus communication protocol, wherein the message includes the contextual information.

In example 38, the method of example 37 is disclosed, wherein the data represent at least one of the following type of contextual information: operation mode information representing an operation mode of the automobile; occupation information representing an occupation of the automobile; navigation information associated with the automobile; loading information of the automobile; visual (e.g., optical, video and/or image) information; radar information representing the automobile (e.g., its position); lidar information representing the automobile (e.g., its position); ultrasonic information representing the automobile (e.g., its position); object detection information representing the automobile (e.g., its position); obstruction information representing the automobile (e.g., its position).

In example 39, the method of example 37 or 38 is disclosed, wherein the data represent an automotive operating function.

In example 40, the method of one of examples 37 to 39 is disclosed, wherein a frequency of the generating the message is changed based on the contextual information.

In example 41, the method of one of examples 37 to 40 is disclosed, wherein the data originates from one or more roadside sensors and/or one or more other vehicles.

In example 42, the method of one of examples 37 to 41 is disclosed, wherein the data originates from a cloud computing network.

In example 43, the method of one of examples 37 to 42 is disclosed, wherein the data originates from an (e.g., cloud based) automobile data avatar representing a time shifted status of the automobile and/or a virtual version of the automobile.

In example 44, the method of one of examples 37 to 43 is disclosed, wherein the (e.g., automotive) fieldbus communication network includes a Controller Area Network, optionally with Flexible Data-Rate; and the (e.g., automotive) fieldbus communication protocol is a Controller Area Network communication protocol.

In example 45, the method of one of examples 37 to 44 is disclosed, wherein the (e.g., automotive) fieldbus communication network includes at least one of the following types of networks of: a Controller Area Network; a Local Interconnect Network; and a FlexRay Network.

In example 46, the method of one of examples 37 to 45 is disclosed, wherein the message includes further at least one of the following: a message identifier identifying the message as including contextual information; a frame number; and/or a time stamp (e.g., of the contextual information); a trust attribute.

In example 47, the method of one of examples 37 to 46 is disclosed, wherein the contextual information include further at least one of the following: a type identifier identifying the type of contextual information; data representing a parameter of the contextual information (e.g., its quantity).

In example 48, the method of one of examples 37 to 47 is disclosed, wherein the contextual information include contextual information of at least one of the following type of contextual information: information of the environment of the automobile (also referred as to exterior information), e.g., information representing an exterior vicinity of the automobile; information of the relationship between the automobile and the environment of the automobile; information of the automobile itself; reference information associated with data about the automobile stored in a database;

roadside information associated with a road underlying the automobile; manufacturer information.

In example 49, a context broadcaster is disclosed, including one or more processors configured to perform the method of one of examples 37 to 48 and/or, including one or more processors configured to: receive data in accordance with the mobile network communication protocol via a mobile communication network, wherein the data represent contextual information associated with the automobile; determine the contextual information based on the data; generate a message (e.g., the CM) in accordance with the fieldbus communication protocol, wherein the message includes the contextual information.

In example 50, the context broadcaster of example 49 is disclosed, further including: a first interface configured to communicate in accordance with the (e.g., automotive) fieldbus communication protocol.

In example 51, the context broadcaster of example 49 or 50 is disclosed, further including: a second interface configured to communicate in accordance with the mobile network communication protocol; wherein the second interface preferably includes an antenna.

In example 52, the context broadcaster of one of examples 49 to 51 is disclosed, wherein the one or more processors are further configured to: receive data from one or more sensors of an automobile, wherein the data represent environmental information associated with an exterior vicinity of the automobile; wherein the contextual information is determined further based on the data.

In example 53, means for (e.g. automotive internal) communication are disclosed, including: means for receiving data in accordance with the mobile network communication protocol via a mobile communication network, wherein the data represent contextual information associated with the automobile; means for determining the contextual information based on the data; means for generating a message (e.g., the CM) in accordance with the fieldbus communication protocol, wherein the message includes the contextual information.

In example 54, a method for (e.g. automotive internal) communication is disclosed, including: receiving a first message (e.g., the AM) in accordance with the fieldbus communication protocol via an (e.g., automotive) fieldbus communication network, wherein the first message includes information indicating (e.g., a status of) an automotive operating function representing an operation of an actuator of an automobile and that an anomaly event associated with the automotive operating function has been determined; sending a second message in accordance with the mobile communication protocol via a mobile communication network to an entity external from the automobile, wherein the second message includes a request for contextual information associated with the automobile, e.g., with the automotive operating function.

In example 55, the method of example 54 is disclosed, wherein the automotive operating function is a powertrain operating function representing an operation of a powertrain of the automobile (e.g., the powertrain including the actuator).

In example 56, the method of example 54 or 55 is disclosed, wherein the automotive operating function is an engine operating function representing an operation of an engine of the automobile (e.g., the engine including the actuator).

In example 57, the method of one of examples 54 to 56 is disclosed, wherein the automotive operating function is a gear operating function representing an operation of an gear of the automobile (e.g., the gear including the actuator).

In example 58, the method of one of examples 54 to 57 is disclosed, wherein the contextual information are associated with the automotive operating function.

In example 59, the method of one of examples 54 to 58 is disclosed, wherein the (e.g., automotive) fieldbus communication network includes a Controller Area Network, optionally with Flexible Data-Rate; and/or the (e.g., automotive) fieldbus communication protocol is a Controller Area Network communication protocol.

In example 60, the method of one of examples 54 to 59 is disclosed, wherein the (e.g., automotive) fieldbus communication network includes at least one of the following types of networks of: a Controller Area Network; a Local Interconnect Network; and a FlexRay Network.

In example 61, the method of one of examples 54 to 60 is disclosed, wherein the first message includes further at least one of the following: information representing a previously received message (e.g., a CM) including further contextual information associated with the automobile; wherein the anomaly event represents that a relation between the further contextual information and the status of the automotive operating function does not fulfills the predefined criterion.

In example 62, the method of one of examples 54 to 61 is disclosed, wherein the first message includes further at least one of the following: a message identifier identifying the message as including anomaly information; a type identifier identifying the type of anomaly; information identifying the origin of the second message; a priority indicator indicating a priority of the second message; the contextual information; data representing a severity of the anomaly; a frame number; and/or a time stamp (e.g., of the contextual information); a trust attribute.

In example 63, the method of one of examples 54 to 62 is disclosed, wherein the first message originates from an automotive controller.

In example 64, the method of one of examples 54 to 63 is disclosed, wherein the first message originates from an automotive controller internal the automobile and/or associated with the automobile.

In example 65, the method of one of examples 54 to 64 is disclosed, further including: generating an alert signal (e.g., visual or audio recognizable alert signal), e.g., via a dash board of the automobile.

In example 66, the method of one of examples 54 to 65 is disclosed, further including: validating the anomaly event based on the contextual information.

In example 67, the method of one of examples 54 to 66 is disclosed, wherein the contextual information originates from one or more roadside sensors and/or one or more other vehicles.

In example 68, the method of one of examples 54 to 67 is disclosed, wherein the contextual information originates from a cloud computing network.

In example 69, the method of one of examples 54 to 68 is disclosed, wherein the contextual information originates from a (e.g., cloud based) automobile data avatar representing a time shifted status of the automobile and/or a virtual version of the automobile.

In example 70, an alert processing device is disclosed, including one or more processors configured to perform the method of one of examples 54 to 69 and/or, including one or more processors configured to: receive a first message (e.g., the AM) in accordance with the fieldbus communication protocol via an (e.g., automotive) fieldbus communication network, wherein the first message includes information indicating a status of an automotive (e.g., powertrain) operating function representing an operation of an actuator of an automobile and that an anomaly event associated with the automotive operating function has been determined; send a second message (e.g., the request message) in accordance with the mobile communication protocol via an mobile communication network to an entity external from the automobile, wherein the second message includes a request for contextual information associated with the automotive operating function.

In example 71, the alert processing device of example 70 is disclosed, further including: a first interface configured to communicate in accordance with the (e.g., automotive) fieldbus communication protocol.

In example 72, the alert processing device of example 70 or 71 is disclosed, further including: an alert indicator configured to output the (e.g., visual or audio recognizable) alert signal, e.g., wherein the alert indicator is to be arranged within an internal space of the automobile.

In example 73, the alert processing device of one of the examples 70 to 72 is disclosed, further including: a second interface configured to communicate in accordance with a mobile communication protocol; wherein the second interface preferably includes an antenna.

In example 74, means for (e.g. automotive internal) communication are disclosed, including: means for receiving a first message (e.g., the AM) in accordance with the fieldbus communication protocol via an (e.g., automotive) fieldbus communication network, wherein the first message includes information indicating a status of an automotive operating function representing an operation of an actuator of an automobile and that an anomaly event associated with the automotive operating function has been determined; means for sending a second message (e.g., the request message) in accordance with the mobile communication protocol via an mobile communication network to an entity external from the automobile, wherein the second message includes a request for contextual information associated with the automotive related operating function.

In example 75, a (e.g., automotive) fieldbus communication network is disclosed, including one or more processors configured to: process at least one of a first message (e.g., a CM) and/or a second message (e.g., a AM), wherein at least one of the first message and/or the second message is in accordance with an (e.g., automotive) fieldbus communication protocol, wherein at least one of the first message and/or the second message is to be send or received via the interface, wherein preferably the second message is generated in response to receiving the first message; wherein the fieldbus communication protocol defines the first message to include contextual information associated with the automobile; wherein the fieldbus communication protocol further defines the second message to include information indicating that an anomaly event associated with an automotive operating function has been determined, wherein the anomaly event represents that a relation between the contextual information and a status of the automotive operating function does not fulfills the predefined criterion; wherein preferably, the automotive operating function represents an operation of an actuator of an automobile; wherein preferably, the fieldbus communication protocol further defines the second message to include information indicating the first information.

In example 76, the (e.g., automotive) fieldbus communication network of example 75 is disclosed, wherein the network communication protocol defines the first message to include at least one of the following: a message identifier identifying the message as including contextual information; a frame number; and/or a time stamp (e.g., of the contextual information); a trust attribute.

In example 77, the (e.g., automotive) fieldbus communication network of example 75 or 76 is disclosed, wherein the network communication protocol defines the contextual information to include: a type identifier identifying a type of the contextual information; and a value identifier identifying a value of the contextual information.

In example 78, the (e.g., automotive) fieldbus communication network one of examples 75 to 77 is disclosed, wherein the network communication protocol defines the second message to include information indicating a status of the automotive (e.g., powertrain) operating function.

In example 79, the (e.g., automotive) fieldbus communication network one of examples 75 to 78 is disclosed, including a Controller Area Network, optionally with Flexible Data-Rate; and/or wherein the (e.g., automotive) fieldbus communication protocol is a Controller Area Network communication protocol.

In example 80, the (e.g., automotive) fieldbus communication network one of examples 75 to 79 is disclosed, including at least one of the following types of networks of: a Controller Area Network; a Local Interconnect Network; and a FlexRay Network.

In example 81, the (e.g., automotive) fieldbus communication network one of examples 75 to 80 is disclosed, wherein the automotive operating function is a powertrain operating function representing an operation of a powertrain of the automobile (e.g., the powertrain including the actuator).

In example 82, the (e.g., automotive) fieldbus communication network one of examples 75 to 81 is disclosed, wherein the automotive operating function is an engine operating function representing an operation of an engine of the automobile (e.g., the engine including the actuator).

In example 83, the (e.g., automotive) fieldbus communication network one of examples 75 to 82 is disclosed, wherein the automotive operating function is a gear operating function representing an operation of an gear of the automobile (e.g., the gear including the actuator).

In example 84, the (e.g., automotive) fieldbus communication network one of examples 75 to 83 is disclosed, wherein the contextual information are associated with the automotive operating function.

In example 85, an (e.g., automotive) alert detection system is disclosed, including: one or more controllers configured according to of one of examples 17 to 19; and/or one or more context broadcasters configured according to one of examples 32 to 34 and/or according to of one of examples 49 to 52; one or more alert processing devices configured according to one of examples 70 to 73; the (e.g., automotive) fieldbus communication network, e.g., according to one of examples 75 to 84, communicatively connecting with each other the: one or more controller, the one or more context broadcaster and/or the one or more alert processing device with each other.

In example 86, an automobile is disclosed, including: a plurality of wheels; a powertrain coupled with the plurality of wheels; and an (e.g., automotive) alert detection system of example 85.

In example 87, an automobile is disclosed, including: a plurality of wheels; a powertrain coupled with the plurality of wheels, wherein the powertrain includes one or more controllers configured according to of one of examples 17 to 19; and preferably, the (e.g., automotive) fieldbus communication network, e.g., according to one of examples 75 to 84, communicatively connecting the one or more controllers.

In example 88, an automobile is disclosed, including: a plurality of wheels; a powertrain coupled with the plurality of wheels; and one or more context broadcasters configured according to one of examples 32 to 34 and/or according to of one of examples 49 to 52; and preferably, the (e.g., automotive) fieldbus communication network, e.g., according to one of examples 75 to 84, communicatively connecting with each other the one or more context broadcasters and the powertrain.

In example 89, an automobile is disclosed, including: a plurality of wheels; a powertrain coupled with the plurality of wheels; and one or more alert processing devices configured according to one of examples 70 to 73; and preferably, the (e.g., automotive) fieldbus communication network, e.g., according to one of examples 75 to 84, communicatively connecting with each other the one or more alert processing devices and the powertrain.

In example 90, a non-transitory computer-readable medium is disclosed, including instructions, which, when carried out by one or more processors, implement the method of any of the examples 1 to 16, 23 to 31, 37 to 48, or 54 to 69:

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A controller, comprising one or more hardware processors configured to:
   control an automotive operating function representing an operation of an actuator of an automobile;
   receive a first message in accordance with a fieldbus communication protocol via a fieldbus communication network, wherein the first message comprises contextual information associated with the automobile;
   determine whether a relation between the contextual information and a status of the automotive operating function fulfills a predefined criterion;
   generate a second message in accordance with the fieldbus communication protocol, wherein the second message comprises information representing a result of the determination and represents an anomaly detection;
   control a wireless communication network to send the second message; and
   receive from the wireless communication network a third message, in response to the second message, wherein the third message represents a confirmation of the anomaly performed outside of the vehicle.

2. The controller of claim 1, wherein the automotive operating function is a powertrain operating function representing an operation of a powertrain of the automobile.

3. The controller of claim 1, wherein the automotive operating function is an engine operating function representing an operation of an engine of the automobile.

4. The controller of claim 1, wherein the automotive operating function is a gear operating function representing an operation of a gear of the automobile.

5. The controller of claim 1, wherein the contextual information is associated with the automotive operating function.

6. The controller of claim 1, wherein the fieldbus communication network comprises a Controller Area Network.

7. The controller of claim 1, wherein the first message comprises further at least one of the following:
   a message identifier identifying the message as comprising contextual information; and
   a time stamp.

8. The controller of claim 1, wherein the contextual information comprises further at least one of the following:
   a type identifier identifying the type of contextual information;
   data representing a parameter of the contextual information.

9. The controller of claim 1, wherein the contextual information comprises contextual information of at least one of the following type of contextual information:
   information representing an exterior vicinity of the automobile;
   information associated with data about the automobile stored in a database;
   information associated with a road underlying the automobile;
   information originating from a manufacturer of the automobile;
   information representing an operation mode of the automobile;
   information representing an occupation of the automobile with passengers;
   information associated with navigating the automobile; and
   information representing a load of the automobile.

10. The controller of claim 1, wherein the second message comprises further:
    information indicating the status of the automotive operating function.

11. The controller of claim 1, wherein the second message comprises further:
    information indicating that an anomaly event associated with the automotive operating function has been determined, wherein the anomaly event represents that the relation between the contextual information and the status of the automotive operating function does not fulfill the predefined criterion.

12. The controller of claim 1, wherein the one or more processors are further configured to:
    determine the relation between the contextual information and the status of the automotive operating function.

13. The controller of claim 1, wherein the one or more processors are further configured to:
    determine the predefined criterion based on the contextual information.

14. The controller of claim 13, further comprising:
    wherein determining the predefined criterion comprises choosing the predefined criterion out of a plurality of predefined criterions stored in the controller.

15. The controller of claim 13, further comprising:
    wherein the predefined criterion represents a range for the status of the automotive operating function to be fulfilled.

16. A controller, comprising one or more hardware processors configured to:
    control an automotive operating function representing an operation of an actuator of an automobile;

receive a first message in accordance with a fieldbus communication protocol via a fieldbus communication network, wherein the first message comprises contextual information associated with the automobile;

determine whether a relation between the contextual information and a status of the automotive operating function fulfills a predefined criterion; and generate a second message in accordance with the fieldbus communication protocol, wherein the second message comprises information representing a result of the determination;

wherein the automotive operating function is a powertrain operating function representing an operation of a powertrain of the automobile, an engine operating function representing an operation of an engine of the automobile, and/or a gear operating function representing an operation of a gear of the automobile; and wherein the second message further comprises information indicating the status of the automotive operating function.

17. The controller of claim 16, wherein the first message further comprises at least one of the following:
   a message identifier identifying the message as comprising contextual information; and
   a time stamp.

18. The controller of claim 16, wherein the contextual information further comprises at least one of the following:
   a type identifier identifying the type of contextual information; and
   data representing a parameter of the contextual information.

19. The controller of claim 16, wherein the contextual information comprises contextual information of at least one of the following type of contextual information:
   information representing an exterior vicinity of the automobile;
   information associated with data about the automobile stored in a database;
   information associated with a road underlying the automobile;
   information originating from a manufacturer of the automobile;
   information representing an operation mode of the automobile;
   information representing an occupation of the automobile with passengers;
   information associated with navigating the automobile; and
   information representing a load of the automobile.

* * * * *